United States Patent
Kongot

(10) Patent No.: US 11,094,096 B2
(45) Date of Patent: Aug. 17, 2021

(54) ENHANCEMENT LAYERS FOR DATA VISUALIZATION

(71) Applicant: SAP SE, Walldorf (DE)

(72) Inventor: Aparna Kongot, Coimbatore/Tamil Nadu (IN)

(73) Assignee: SAP SE, Walldorf (DE)

( * ) Notice: Subject to any disclaimer, the term of this patent is extended or adjusted under 35 U.S.C. 154(b) by 25 days.

(21) Appl. No.: 16/265,053

(22) Filed: Feb. 1, 2019

(65) Prior Publication Data

US 2020/0250871 A1 Aug. 6, 2020

(51) Int. Cl.
*G06T 11/60* (2006.01)

(52) U.S. Cl.
CPC .......... *G06T 11/60* (2013.01); *G06T 2200/24* (2013.01)

(58) Field of Classification Search
CPC ... G06T 11/60; G06T 2200/24; G06T 11/206; G06T 19/00; G06F 16/26; G06F 17/00; G06F 17/24; G06F 40/18; G06F 40/169; G06F 40/177; G06F 16/34; G06F 16/287; G06F 16/358; G06F 3/0484; G09G 2340/12; G09G 5/377
See application file for complete search history.

(56) References Cited

U.S. PATENT DOCUMENTS

| | | | |
|---|---|---|---|
| 6,185,582 B1 * | 2/2001 | Zellweger | G06F 17/246 715/212 |
| 6,256,649 B1 * | 7/2001 | Mackinlay | G06F 17/246 345/473 |
| 8,046,677 B2 * | 10/2011 | Eischeid | G06F 40/18 715/212 |
| 2006/0004618 A1 * | 1/2006 | Brixius | G06Q 10/06 705/7.18 |
| 2006/0080594 A1 * | 4/2006 | Chavoustie | G06F 40/18 715/218 |
| 2008/0109439 A1 * | 5/2008 | Wu | G06F 16/243 |
| 2009/0276724 A1 * | 11/2009 | Rosenthal | G06F 3/0482 715/771 |
| 2014/0331162 A1 | 11/2014 | Kongot | |
| 2016/0132817 A1 | 5/2016 | Kongot | |
| 2016/0364740 A1 * | 12/2016 | Parker | G06Q 30/0205 |
| 2017/0060348 A1 | 3/2017 | Kongot | |
| 2017/0124049 A1 * | 5/2017 | Campbell | G06K 9/00463 |
| 2018/0137667 A1 * | 5/2018 | Kindelsberger | G06F 3/0482 |
| 2018/0203838 A1 * | 7/2018 | Hiatt | G06F 16/285 |
| 2019/0258627 A1 * | 8/2019 | Rosenthal | G06F 3/0482 |

(Continued)

*Primary Examiner* — Chante E Harrison
(74) *Attorney, Agent, or Firm* — Klarquist Sparkman, LLP

(57) ABSTRACT

Enhancement layers for data visualization over data sets are provided herein, as is a process for performing data visualization enhancement operations using enhancement layers. A data set may be received for display. A first display layer may be generated. The first display layer may include a base layer rendering the data set in a table. A plurality of data elements in the data set may be identified as having a relationship. The relationship may be identified by a machine-learning process. A second display layer may be generated. The second display layer may include an enhancement layer rendering the relationship between the identified plurality of data elements. The first display layer may be displayed. The second display layer may be displayed over the first display layer. The layers may be visually aligned based on the plurality of data elements.

20 Claims, 17 Drawing Sheets

(56) References Cited

U.S. PATENT DOCUMENTS

2019/0272893 A1\* 9/2019 Laurance ............... G16B 45/00
2019/0318515 A1\* 10/2019 Ito ......................... G06T 11/206
2019/0347347 A1\* 11/2019 Griffith ............... G06F 16/2365
2020/0042588 A1\* 2/2020 Sagalovskiy ........... G06F 40/14

\* cited by examiner

| Description | | | | | Quantity | Created On | Created By |
|---|---|---|---|---|---|---|---|
| ∨ Aircraft - MBOM | | | | | 403 units | 01.01.2014 | John Miller |
| ∨ Chassis | | | | | 40 units | 01.01.2014 | John Miller |
| ∨ Engine | | | | | 38 units | 01.01.2014 | Donna Moore |
| | Cylinder Block | | | | 20 pieces | 01.01.2014 | Donna Moore |
| | Spark Plug | | | | 12 pieces | 08.01.2014 | John Miller |
| | Crankshaft | | | | 12 pieces | 01.01.2014 | Donna Moore |
| | Piston | | | | 12 pieces | 01.01.2014 | Donna Moore |
| > Cockpit | | | | | 12 units | 01.01.2014 | John Miller |
| > Tail | | | | | 12 units | 01.01.2014 | John Miller |
| ∨ Rear Wheels | | | | | 61 units | 01.01.2014 | Donna Moore |
| | Hub | | | | 10 pieces | 01.01.2014 | Donna Moore |
| | Nuts | | | | 9 pieces | 01.01.2014 | John Miller |
| | Bolts | | | | 10 pieces | 01.01.2014 | Donna Moore |
| | Screws | | | | 32 pieces | 05.15.2014 | Donna Moore |

| Aircraft - MBOM | | | | |
|---|---|---|---|---|
| Description | | Quantity | Created On | Created By |
| ∨ Serial Tail Production | | | 01.01.2014 | John Miller |
| ∨ Chassis | | | 01.01.2014 | John Miller |
| ∨ Drilling Operation | | | 01.01.2014 | Donna Moore |
| [1] Stage 1  1 June 9:00 – 9:15 AM  [15m] [WC1] | | 20 pieces | 01.01.2014 | Kim Mae |
| [3] Stage 2  1 June 2:00 – 4:15 PM  [2.5h] [WC1] | | 12 pieces | 08.01.2014 | Kim Mae |
| Stage 3 | | | 01.01.2014 | Donna Moore |
| [2] Stage 4  1 June 10:00 – 10:15 AM  [15m] [WC1] | | 12 pieces | 01.01.2014 | Kim Mae |
| > Welding Operation | | | 01.01.2014 | John Miller |
| > Testing Operation | | | 01.01.2014 | John Miller |
| ∨ Packaging Operation | | | 01.01.2014 | Donna Moore |
| Stage 1 | | | 01.01.2014 | Donna Moore |
| [4] Stage 2  1 June 5:00 – 6 PM  [1h] [WC1] | | 9 pieces | 01.01.2014 | Kim Mae |
| Stage 3 | | | 01.01.2014 | Donna Moore |
| Stage 4 | | 53 pieces | 05.15.2014 | Donna Moore |

FIG. 4C

ENHANCEMENT LAYERS FOR DATA VISUALIZATION

FIELD

The present disclosure generally relates to user interfaces, graphical user interfaces, and UI controls. Particular implementations relate to data visualization, and systems and methods for layering a variety of data visualizations over displayed data, such as for enhancing data displays.

BACKGROUND

Enterprise data systems often provide very large and very complex data sets. Such large data sets may be provided to users in a structured display, such as through tables. However, such displays often do not easily allow a user to recognize data trends, relationships, or other important insights based on the data, which are often important for analysis and decision-making. Diagrammatic representations, such as process flows, may provide more understanding about some processes or relationships, but often do not provide sufficient detail about the data set for decision-making, and generally lack the ability to manipulate the data set, such as by grouping or sorting. Even if logic is available for detailed analysis of such large data sets, the analysis is generally not presented in such a detailed and understandable manner for a user. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A process for performing data visualization enhancement operations is provided herein. A data set may be received for display. A first display layer may be generated. The first display layer may include a base layer rendering the data set in a table. A plurality of data elements in the data set may be identified as having a relationship. The relationship may be identified by a machine-learning process. A second display layer may be generated. The second display layer may include an enhancement layer rendering the relationship between the identified plurality of data elements. The first display layer may be displayed. The second display layer may be displayed over the first display layer. The layers may be visually aligned based on the plurality of data elements.

A method for generating data visualization enhancements is provided herein. A data set having multiple data elements may be displayed. The data set may be displayed in a first display layer. One or more relationships between respective sets of data elements of the multiple data elements may be identified. One or more enhancement layers corresponding to the one or more identified relationships may be generated. The one or more enhancement layers may be displayed over the first display layer, such that the data displayed in the first display layer may be enhanced by the one or more displayed enhancement layers. The data may be enhanced by graphically representing the identified one or more relationships in association with the corresponding data elements.

A method for graphical data presentation enhancements is provided herein. A data set may be displayed in a first graphical layer. The data set may be analyzed to determine a relationship between two or more elements in the data set. A graphical representation of the determined relationship between the two or more data elements may be generated. The graphical representation of the determined relationship may be displayed in a second graphical layer. Displaying the graphical representation may include overlaying the displayed data set with the graphical representation of the determined relationship such that the graphical representation of the relationship is aligned with the two or more elements displayed in the data set and the two or more data elements are connected by the graphical representation of their relationship.

The foregoing and other objects, features, and advantages of the invention will become more apparent from the following detailed description, which proceeds with reference to the accompanying figures.

BRIEF DESCRIPTION OF THE DRAWINGS

FIG. 4B is an example user interface displaying inventory supply and use data visualized with enhancement layers.

FIG. 4C is an example user interface displaying task, sequence of flow, and responsibility data visualized with enhancement layers.

DETAILED DESCRIPTION

Figure 1A:
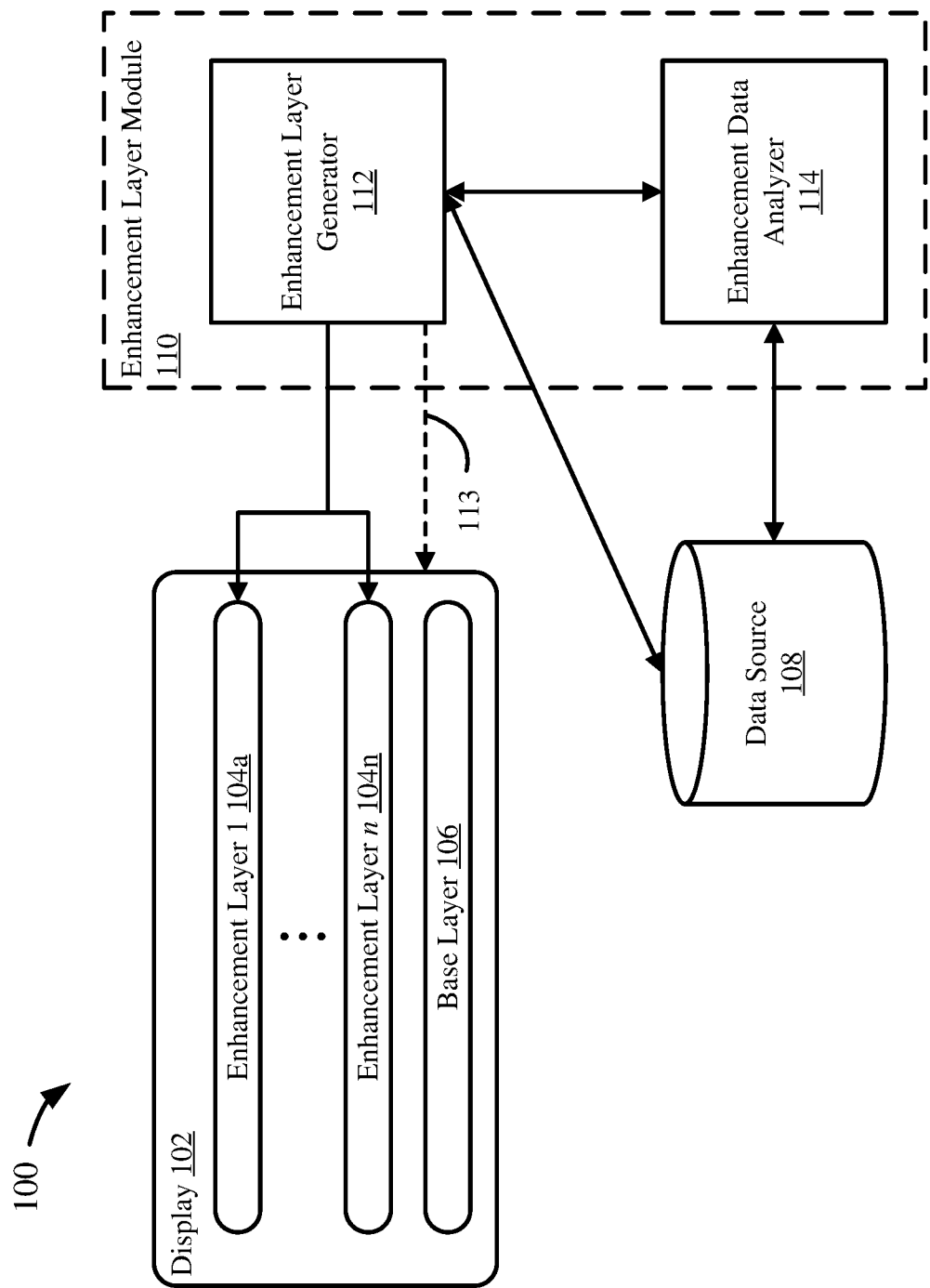
FIG. 1A is a schematic diagram depicting an architecture for an enhancement layer module.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Enhancement Layers Overview

Many applications rely on tables for data visualization, as a table can display a large amount of data in a structured manner, and include the ability to group, sort, filter, or view totals. However, tables are generally not good for deriving insights or relationships amongst the data, or for reasoning through the data. Even if logic or intelligence is used to manipulate the data, displaying such manipulated data in the traditional table UI (user interface) still does not present such information in a readily understandable or effective manner Generally, tables lack intuitiveness and an ability to pro-actively direct users to insights or relationships in the data.

Traditional diagrammatic representations, such as process flows, may be more intuitive for understanding relationships in data sets, but are often ineffective for handling large data volumes or providing detail about the data. Further, they generally lack other important features, such as grouping, filtering, sorting, or viewing totals. Thus, neither tables nor diagrammatic representations effectively provide the data visualization often sought by users, data visualizations which may help users draw insights that can lead to making quicker, more accurate and informed decisions.

The enhancement layers for data visualization as provided herein can help remedy such issues by providing a UI control that has the practicality of a table combined with the intuitiveness of a diagram. The enhancement layers may be provided as an overlay for a traditional table, or may function as a standalone display that can include capabilities such as calculating totals, sorting data, grouping data, or filtering data. The enhancement layers may also provide functionality to derive logic and relationships from the data and provide visualization of such insights or relationships determined from the data.

For example, an enhancement layer or a combination of enhancement layers may read data from a data set (e.g. multiple columns or rows, or both, in a table) and use a formula, machine-learning algorithm, or other analytical process to derive relationships, trends, or other data-driven metrics or insights from the data set. The enhancement layer(s) may then present any such derived data to a user through visualizations as disclosed herein. The enhancement layer(s) can also visually highlight relationships between data displayed in table columns or rows, or both.

The enhancement layers effectively and quickly communicate detailed information about a data set that otherwise would require extensive time and analysis to identify merely from reviewing the data set itself. The enhancement layers further improve the presentation or communication of such analytical information by providing the information in ways more naturally understandable by users, such as by using spatial layout or flow, visual cues, highlighting or focusing, simplification or drill-down data hiding, or natural language descriptions. The logic and relationships shown amongst data in a data set through enhancement layers can bring forward key insights that are often highly sought after in data analysis and decision-making. Enhancement layers can merge data and diagrammatic presentations, offering the best of both worlds. Layers, as described herein, may refer to a set of visual objects or representations that are grouped together for display. When rendered, generally all objects in the layer are displayed (other layers may obscure or partially obscure the objects). A layer may also refer to the program code, configuration parameters, file, or other technical module that is used to describe the layer, and may be executed or interpreted to display the layer. Layers may be executed or displayed independently of other layers, or other currently displayed objects.

Generally, the enhancement layers form a UI control that integrates tables, logic bubbles, connectors, transparent layers, and columns and rows in a way that proactively pushes meaningful insights, relationships, and other analytical results to the user. As a UI control, such enhancement layers may hide, reveal, or partly reveal displayed data, or may be displayed adjacent or tangentially to displayed data, for enhancing the data. The enhancement layers generally display additional data or information rendered in a non-traditional manner.

The enhancement layers may be implemented as a UI control used in conjunction with existing data displays, such as tables (e.g. overlaying existing displays or display logic). Additionally or alternatively, the enhancement layers may be implemented as UI controls displaying data independently, without other UI controls or other data displays. Thus, the enhancement layers may provide data as a standalone data display or interface (e.g. displaying a table as well as enhancements to the table), and so may be used as the primary data display or interface for an analytics application or service.

Enhancement layers for improved data visualization may be provided in data analytics software, database software, enterprise resource planning software, or other data display or visualization software. Examples of such tools are: Supply Base Optimization™, Manage Supplier Negotiations™, Manufacturing Bill of Materials™, Enterprise Architect™, SAP HANA™, HANAWebIDE/Studio™, all by SAP SE of Walldorf, Germany.

Example 2—Enhancement Layers Architecture

FIG. 1A is a schematic diagram depicting an architecture 100 for an enhancement layer module 110. An enhancement layer module 110 may generate one or more enhancement layers 104a-n. The enhancement layers 104a-n may be rendered in a display 102, which may also contain a base layer 106. Generally, the base layer 106 displays a data set, such as a table and the composite rows and columns of data. In some cases, the base layer 106 may be a type of enhancement layer which displays a data set in a manner particularly configured for use with other enhancement layers over it. For example, a base layer may display data fields with tags or other metadata for use in aligning other enhancement layers over it. In other cases, the base layer may be a standard data display (e.g. table display).

The enhancement layers 104a-n may overlay the base layer 106 in the display 102 to provide enhanced visualization of the data in the base layer 106. The enhancement layers 104a-n may alter, highlight, hide, summarize, or add diagrammatic presentations that blend with the underlying data. In some cases, the enhancement layers 104a-n may pull from data not displayed to derive additional data relationships or insights for visualization.

The enhancement layer module 110 may have an enhancement layer generator 112 and an enhancement data analyzer 114. The enhancement layer generator 112 may generate the enhancement layers 104a-n based on data from a data source 108, such as a database management system. Data from the data source 108 may also be displayed in the display 102, such as in the base layer 106. In some embodiments, the enhancement layer generator 112 may be a set of unrendered visual representations or screens (e.g. code, configuration settings, templates, etc.), which when rendered become the enhancement layers 104a-n. In other embodiments, the enhancement layer generator 112 may generate the appropriate rendered enhancement layers 104a-n.

In some embodiments, the enhancement layer generator 112 may generate 113 the base layer 106 in addition to the enhancement layers 104a-n. In other embodiments, the enhancement layer generator 112 may generate 113 the display 102, including one or more (including all) of the enhancement 104a-n and base 106 layers. The display 102 may be rendered or embedded in a screen display, such as through an operating system.

The enhancement data analyzer 114 may analyze data from the data source 108 for use in generating the enhancement layers 104a-n. The data analyzed may be all of a portion of the data displayed 102, such as displayed in the base layer 106, or may be additional data related to the displayed data, such as that found in the data source 108 (or other data sources), but not displayed in the base display. The enhancement data analyzer 114 may utilize various techniques, such as formulas, rules, heuristics, or machine-learning algorithms to identify relationships, process flows, connections, or other insights into the data displayed that may be usefully visualized in the enhancement layers 104a-n. In some cases, the enhancement data analyzer 114 may convert data into natural language for ease of understanding or quick review. When converting data into natural language, the enhancement data analyzer 114 may use rules or formulas (e.g. templates) to generate simple natural language descriptions, or the enhancement data analyzer may use machine-learning algorithms trained to translate such data into natural language. The enhancement data analyzer 114 may be a set of multiple analyzation modules developed to execute particular algorithms or analysis on identified data for display and enhancement.

In some embodiments, the enhancement data analyzer 114 may be implemented, in whole or in part, in another system separate from the enhancement layer module 110. For example, an analytics system or database management system may perform the relevant analysis for identifying particular data relationships, which may then be passed to the enhancement layer module 110 for use in generating the enhancement layers 104a-n.

In other embodiments, the enhancement data analyzer 114 may be embedded or linked to an enhancement layer 104a-n for processing or analyzing data for particular portions of data relevant to that layer.

Figure 1B:
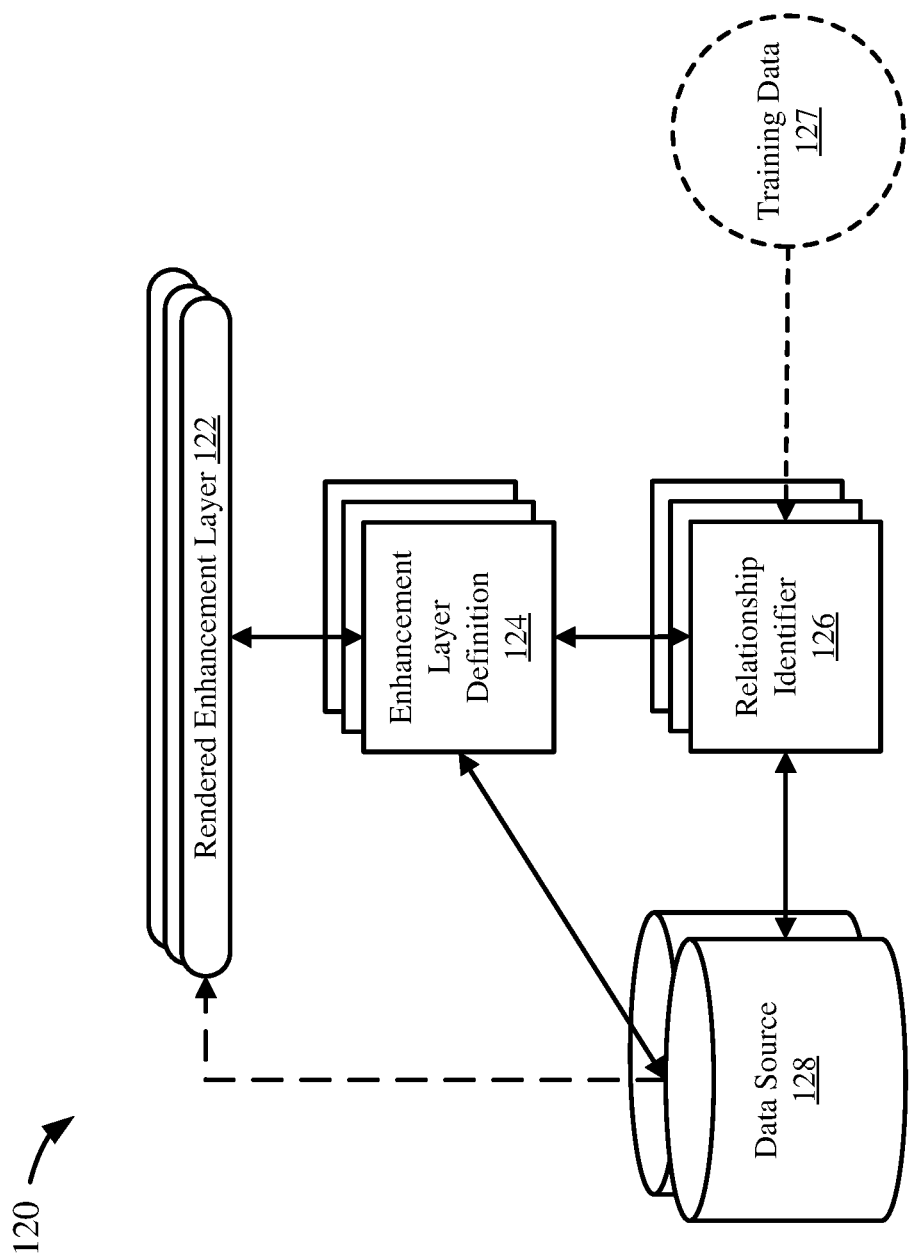
FIG. 1B is a schematic diagram depicting an architecture for enhancement layers.

FIG. 1B is a schematic diagram depicting an architecture 120 for enhancement layers. One or more enhancement layer definitions 124 may be used to generate or render one or more rendered enhancement layers 122. An enhancement layer definition 124 may be executable code, interpretable code, configuration files or settings, or other similar programmatic files. The enhancement layer definitions 124 may be executed (or interpreted, etc.) to generate the rendered enhancement layers 122. The enhancement layer definitions 124 may access one or more data sources 128 to obtain the data for displaying in the rendered enhancement layers 122, and for use in generating the rendered enhancement layers 122. The data sources 128 may be similar to the data source(s) 108 shown in FIG. 1A. In some cases, data from the data sources 128 may be displayed without significant change or enhancement in one or more of the rendered enhancement layers 122. For example, a base layer may be included with the rendered enhancement layers 122 that displays a data set as retrieved from the one or more data sources 128, which may be accomplished by an enhancement layer definition 124 (e.g. a base layer definition).

In some embodiments, the enhancement layer definitions 124 may form the enhancement layer generator 112, as shown in FIG. 1A. In other embodiments, the enhancement layer definitions 124 may be dynamically generated by the enhancement layer generator 112, as shown in FIG. 1A. In such embodiments, the enhancement layer definitions 124 may be generated based on, at least in part, the results from the relationship identifiers 126.

The enhancement layer definitions 124 may access one or more relationship identifiers 126 for analyzing data in the one or more data sources 128. The relationship identifiers 126 may analyze a data set obtained from the one or more data sources to determine insights in the data, or relationships between data elements of the data set. For example, a relationship identifier 126 may identify that as one field increases in value, another field tends to decrease in value. This relationship (field two decreasing as field one increases) may be passed to the enhancement layer definition 124, which then formats the relationship, as described herein, for display in the rendered enhancement layers 122.

In some embodiments, the relationship identifiers 126 may form at least part of the enhancement data analyzer 114, as shown in FIG. 1A. In other embodiments, the relationship identifiers 126 may be dynamically accessed by the enhancement data analyzer 114 or the enhancement layer generator 112 (or both), as shown in FIG. 1A.

The relationship identifiers 126 may be rules, formulas, analytical algorithms (e.g. heuristic algorithms), or machine-learning algorithms. In some cases, the relationship identifiers 126 may be specially designed or trained for the enhancement layer definitions 124. In other cases, the relationship identifiers 126 may be developed or trained for data set analysis, the results of which may then be converted for use in the rendered enhancement layers 122 by the enhancement layer definitions 124.

Relationship identifiers 126 may be machine-learning algorithms trained with training data 127. The training data 127 may focus the machine-learning algorithm on analysis of the data set from the data sources 128. Alternatively or additionally, the training data 127 may utilize knowledge from enhancement layers for identifying relationships or insights in a data set (from the data sources 128). For example, previous rendered enhancement layers with displayed relationships may be used in the training data 127, to encourage or discourage identifying and displaying particular relationships. Similarly, such trained machine-learning algorithms may be used, in whole or in part, to generate the enhancement layer definitions 124 or the rendered enhancement layers 122, such as through the enhancement layer generator 112, as shown in FIG. 1A.

In some cases, a specific enhancement layer definition 124 may generate when executed a specific rendered enhancement layer 122. In other cases, a specific enhancement layer definition 124 may be used dynamically to generate multiple rendered enhancement layers 122 based upon display changes or data set changes.

In some cases, a specific relationship identifier 126 may be associated with a specific enhancement layer definition 124, such as by being called by that enhancement layer definition, or generating that enhancement layer definition. In other cases, the specific relationship identifier may be accessed by multiple enhancement layer definitions, or the results of the relationship identifier may be provided to multiple enhancement layer definitions. In some cases, a given enhancement layer definition 124 may access, or receive results from, multiple relationship identifiers 126.

Example 3—Generating Enhancement Layers

Figure 2A:
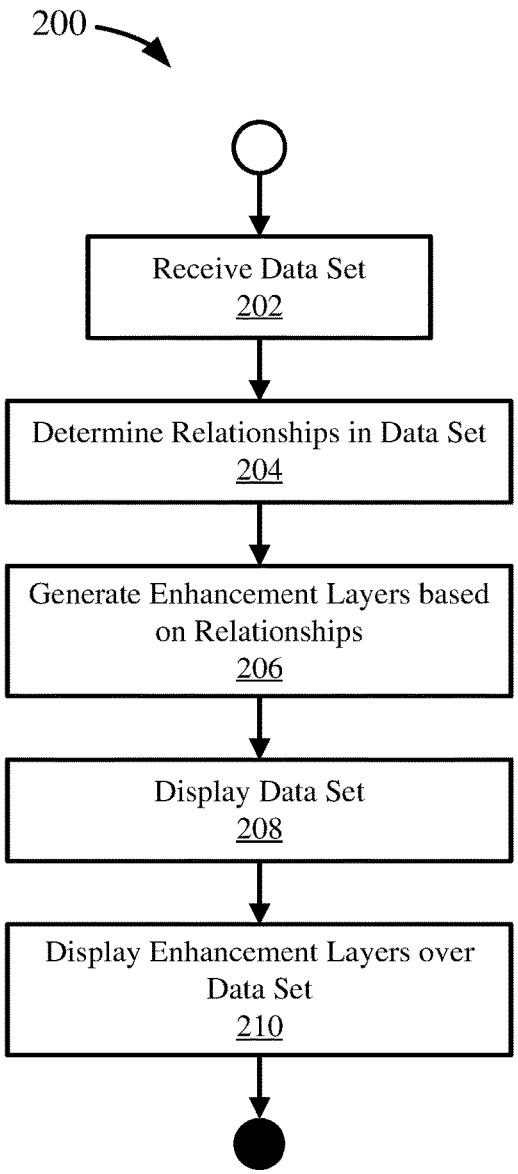
FIG. 2A illustrates a process for generating enhancement layers based on identified relationships in a displayed data set.

FIG. 2A illustrates a process 200 for generating enhancement layers based on identified relationships in a displayed data set. A data set, generally for display, may be received at 202. Receiving the data set may include receiving the actual data set, or may include receiving a reference to the data set. The reference to the data set may be a memory location (e.g. shared memory), a pointer, a file name, or other data address.

One or more relationships (e.g. insights) between data elements in the data set may be determined at 204. The relationships may be determined between rows, columns, data objects, specific data elements, or combinations thereof. The relationships determined may include a single data element (e.g. a single field, a single row, a single column, etc.), such as identifying that a particular field or column has a low relevancy to the data set, or can be readily summarized in place of displaying the actual data. Determining the relationships at 204 may be accomplished by one or more rules, formula, analytics algorithms (e.g. heuristic algorithms), or machine-learning algorithms.

One or more enhancement layers may be generated at 206, generally based on the relationships determined at 204. The enhancement layers may be generated using enhancement layer definitions (e.g. code or configuration files) for displaying the determined relationships. Generating an enhancement layer at 206 may include executing code defining the enhancement layer, or interpreting code or configuration/display information defining the enhancement layer. In some embodiments, the enhancement layer definitions may be generated at 206 based on the determined relationships, thus making the enhancement layers dynamic Such dynamic enhancement layers may then be executed for generating the enhancement layer for display. Alternatively or additionally, the enhancement layers generated may be selected from already available enhancement layer definitions that are applicable to the determined relationships.

The data set may be displayed at 208, such as in a base layer or table enhancement layer as described herein. In some embodiments, the data set may be displayed immediately upon receipt, such that the data set may be observed while it is analyzed for relationships, and the applicable enhancement layers are generated.

The enhancement layers generated at 206 may be displayed at 210 over the data set displayed at 208. The enhancement layers may overlay the displayed data set, so as to enhance the data displayed to highlight, indicate, or otherwise make understandable to a user the relationships identified, as described herein.

Figure 2B:
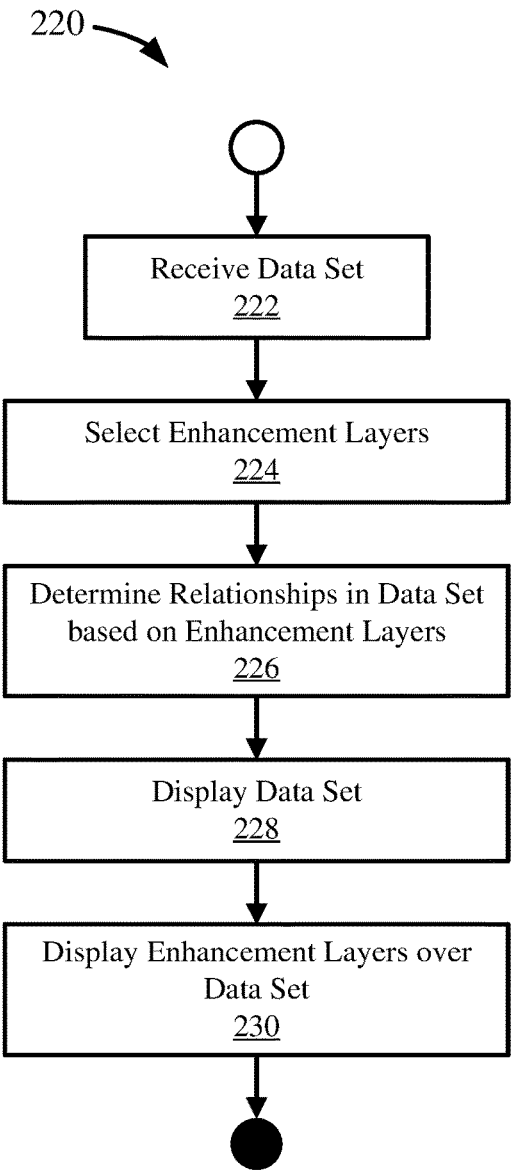
FIG. 2B illustrates an alternate process for generating enhancement layers based on identified relationships in a displayed data set.

FIG. 2B illustrates an alternate process 220 for generating enhancement layers based on identified relationships in a displayed data set. A data set, generally for display, may be received at 222, similarly to step 202 in process 200 shown in FIG. 2A. Receiving the data set may include receiving the actual data set, or may include receiving a reference to the data set. The reference to the data set may be a memory location (e.g. shared memory), a pointer, a file name, or other data address.

One or more enhancement layers may be selected at 224. The enhancement layers may be selected to highlight insights or relationships in the data set received at 222. The enhancement layers may be selected based on the received data set, which may include accessing any metadata associated with the data set. Alternatively or additionally, the enhancement layers may be selected based on received input, such as user or system selections that indicate which enhancement layers to apply to the data set. Such selections may be received with the data set at 222 or may be received or solicited and received at 224.

One or more relationships (e.g. insights) between data elements in the data set may be determined at 226 based on the enhancement layers selected at 224. For example, a given enhancement layer may call or otherwise activate a function, method, library, or other code module for identifying one or more particular relationships in the data set. Thus, determining the relationships at 226 may include executing (interpreting, etc.) or generating and executing the selected enhancement layers at 224.

The relationships may be determined between rows, columns, data objects, specific data elements, or combinations thereof. The relationships determined may include a single data element (e.g. a single field, a single row, a single column, etc.), such as identifying that a particular field or column has a low relevancy to the data set, or can be readily summarized in place of displaying the actual data. Determining the relationships at 226 may be accomplished by one or more rules, formula, analytics algorithms (e.g. heuristic algorithms), or machine-learning algorithms.

The data set may be displayed at 228, such as in a base layer or table enhancement layer as described herein, similarly to step 208 in process 200 shown in FIG. 2A. In some embodiments, the data set may be displayed immediately upon receipt, such that the data set may be observed while it is analyzed for relationships, and the applicable enhancement layers are generated.

The enhancement layers selected at 224 may be displayed at 230 over the data set displayed at 228, similarly to step 210 in process 200 shown in FIG. 2A. The enhancement layers may overlay the displayed data set, so as to enhance the data displayed to highlight, indicate, or otherwise make understandable to a user the relationships identified, as described herein.

Example 4—Enhancement Layer Arrangement

Figure 3A:
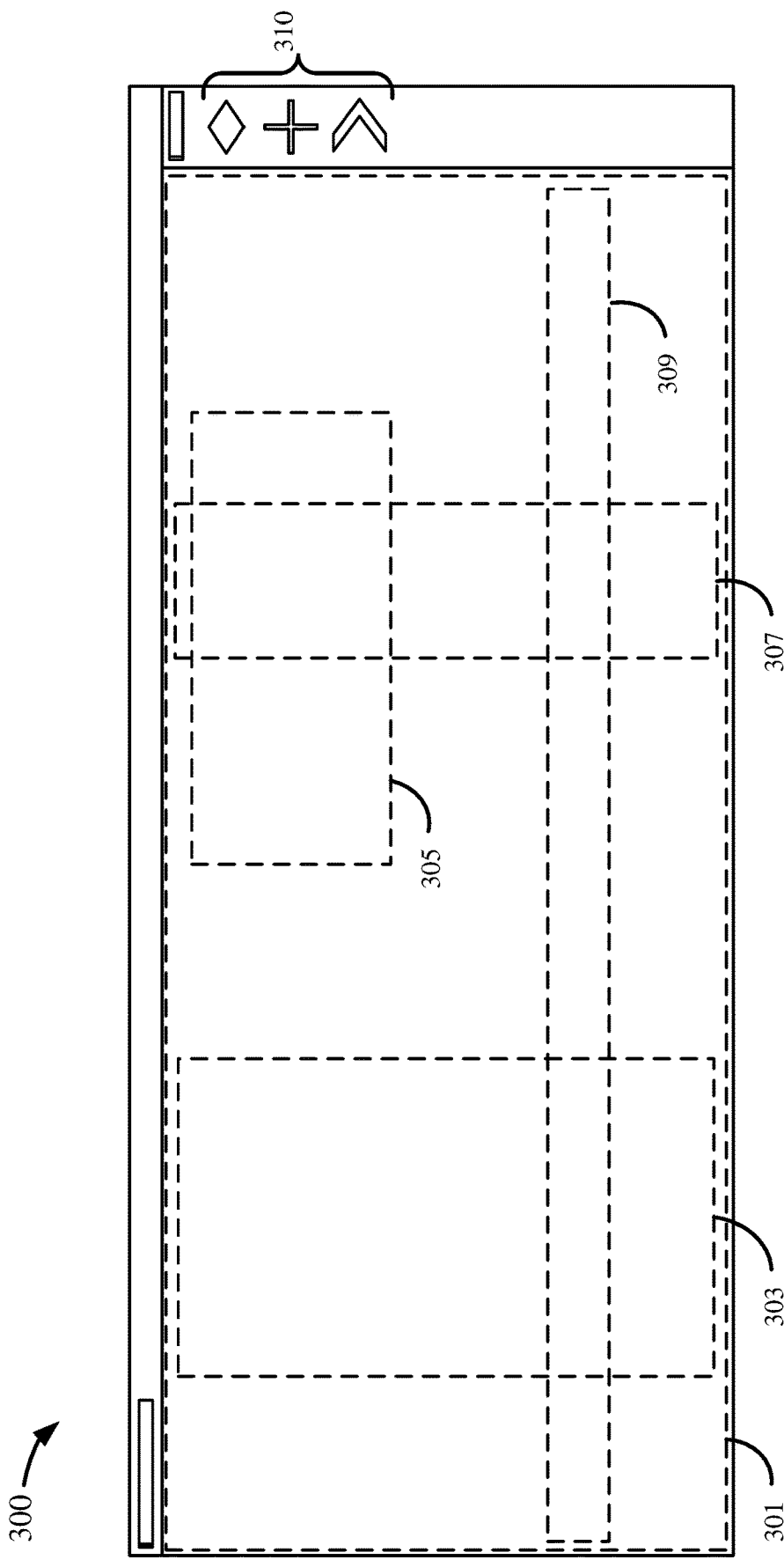
FIG. 3A is a diagram depicting an arrangement of enhancement layers in a user interface 300.

FIG. 3A is a diagram depicting an arrangement of enhancement layers in a user interface 300. A user interface 300 may display a data set using one or more enhancement layers 301, 303, 305, 307, 309. The enhancement layers 301, 303, 305, 307, 309 may be arranged independently of each other, or with respect to one or more enhancement layers on which it is overlaid.

Generally, the enhancement layers 301, 303, 305, 307, 309 may be arranged based on the data represented below them, such as in a base layer. For example, layer 301 may be a base layer. Enhancement layer 303 may be arranged over layer 301 to enhance or otherwise alter, as described herein, data presented in the portion of layer 301 aligned with layer 303. For example, layer 303 may overlay two columns of data in layer 301. Similarly, layer 307 may overlay one column of data in layer 301. Similarly, layer 309 may overlay a row of data in layer 301. Layer 305 may overlay a portion of layer 301 that is neither a row nor a column Such a portion may be determined based on the analysis of the data presented in the overlaying portion, such as described herein.

The enhancement layers 301, 303, 305, 307, 309 may overlap as shown in FIG. 3A. In some cases, each layer may function independently in the overlap area (e.g. presentation by the overlapping layers may all be rendered). In other cases, the presentation of one or more of the overlapping layers may be altered based on the layer overlap. The manner of alteration of the display in the overlap area may be based on which layers overlap, the types of the overlapping layers, the data for display in the overlap area, or rules or other logic for determining the overlap display, or any combination thereof.

Thus, the enhancement layers 301, 303, 305, 307, 309 need not span the entire display area (e.g. screen) and may interact with or enhance other layers or displayed data objects, even if not hierarchically adjacent. Accordingly, such enhancement layers 301, 303, 305, 307, 309 may be implemented as containers, patches, pieces, capsules, or other display objects effecting the enhancement layer functionality as described herein.

The user interface 300 may have a set of buttons or widgets 310 for the enhancement layers 301, 303, 305, 307, 309. The widgets 310 may activate or deactivate one or more enhancement layers 301, 303, 305, 307, 309. Activating or deactivating may include displaying or hiding one or more associated enhancement layers 301, 303, 305, 307, 309, or may include rendering or re-rendering one or more associated enhancement layers, or may include processing or re-processing logic or other functionality associated with one or more enhancement layers (or a combination thereof). The widgets 310 may provide for customization of one or more enhancement layers 301, 303, 305, 307, 309.

Example 5—Table Enhancement Layer

Figure 3B:
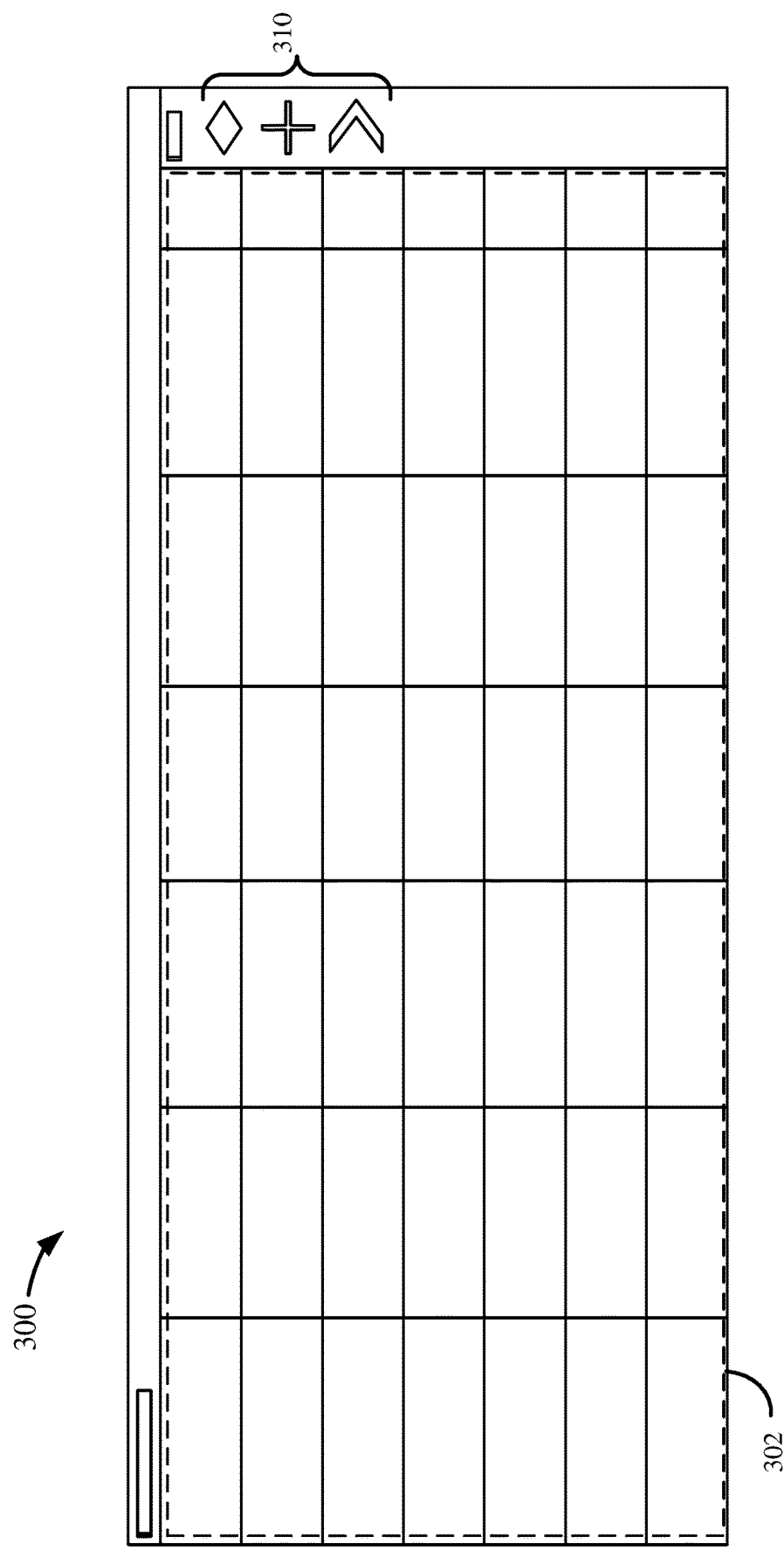
FIG. 3B is a diagram depicting a table enhancement layer in the user interface of FIG. 3A.

FIG. 3B is a diagram depicting a table enhancement layer in a user interface 300. The user interface 300 may be similar to the user interface 300 shown in FIG. 3A. The user interface 300 may have a set of one or more buttons or widgets 310 for enhancement layers, similar to the widgets 310 in FIG. 3A.

The user interface 300 may have a table enhancement layer 302. The table enhancement layer 302 may be a base layer, as described herein and shown in FIG. 1A. The table enhancement layer 302 may have one or more cells, arranged in one or more columns and one or more rows. Data may be displayed, generally discretely, in the various cells of the table enhancement layer 302.

The table enhancement layer 302 may have data manipulation capabilities such as grouping, sorting, filtering, hiding/viewing, highlighting, calculating and viewing totals or other aggregate values (e.g. values generated using formulas), or other data manipulation functionality.

The table enhancement layer 302 may also be capable of connecting with other enhancement layers to enhance the overall presentation of the data displayed in the table enhancement layer. For example, the table enhancement layer may have tags or other metadata or programmatic indicators for aligning other enhancement layers over it. Such tags may be attributed to specific fields, rows, columns, or other displayed data objects.

Example 6—Transparency Enhancement Layer

Figure 3C:
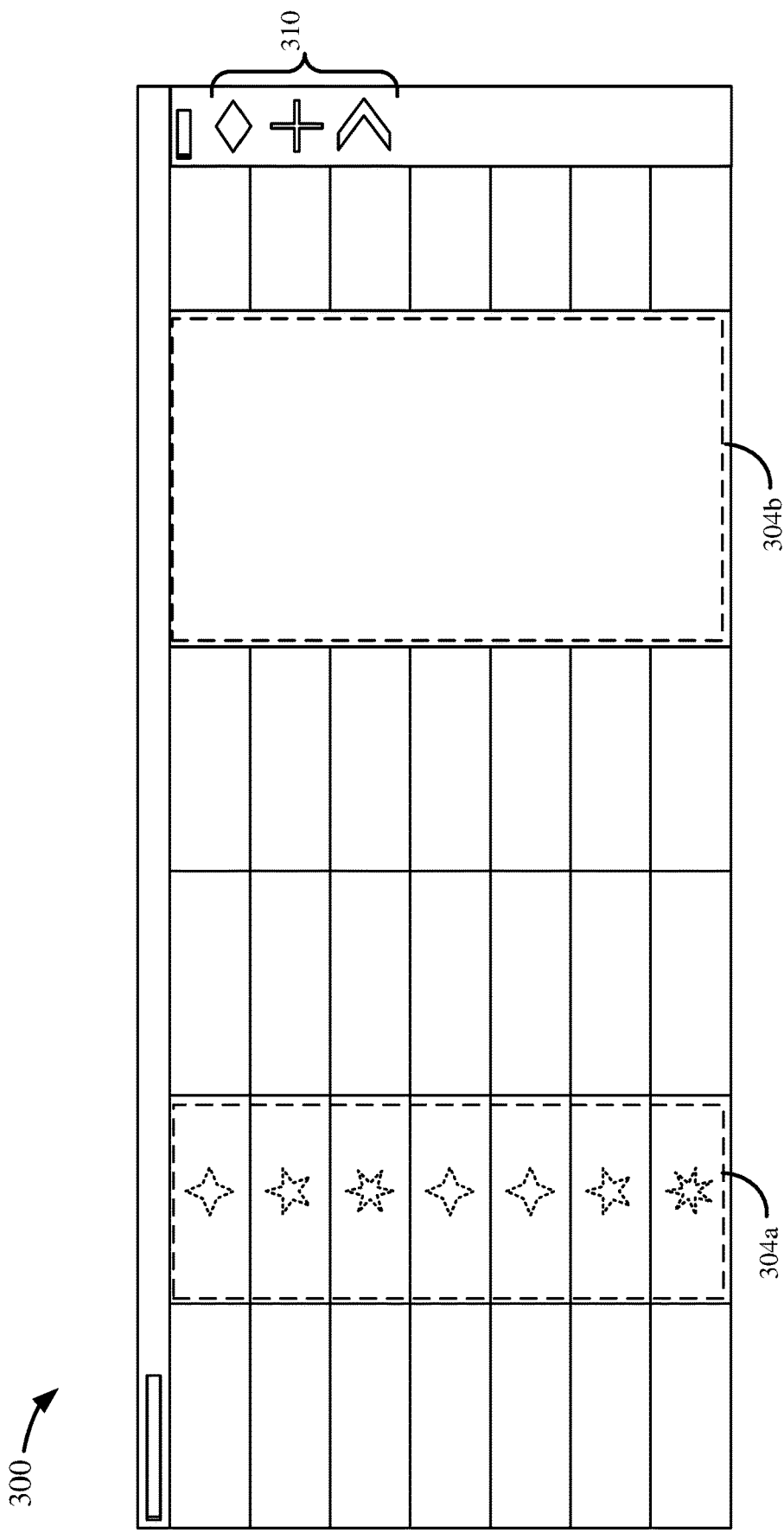
FIG. 3C is a diagram depicting a transparency enhancement layer in the user interface of FIG. 3A.

FIG. 3C is a diagram depicting a transparency enhancement layer in the user interface 300. The user interface 300 may be similar to the user interface 300 shown in FIGS. 3A-B. The user interface 300 may have a set of one or more buttons or widgets 310 for enhancement layers, similar to the widgets 310 in FIGS. 3A-B.

The user interface 300 may have a transparency enhancement layer, such as transparency layer 304a or transparency layer 304b. A transparency enhancement layer 304a, 304b may have a transparency level that may show, hide, or partially show the region or data under the layer. Such a transparency layer 304a, 304b may highlight or draw attention to important data, or visually suppress or draw attention away from minor or unimportant data. A transparency enhancement layer 304a, 304b may have color, including no color or clear (or background color to appear clear), for highlighting or suppressing the data or region under the layer.

A transparency layer 304a may provide partial transparency. A partial transparency layer 304a may partially obscure or reduce the visibility of data displayed below the partial transparency layer. The visibility effects of a partial transparency layer 304a may affect entire cells or the entire portion under the partial transparency layer, or may affect the data displayed under the layer without affecting the surrounding region under the layer, or may affect the data and the surrounding region under the layer differently. Visibility effects may include dimming or "graying out" the data or area under the layer 304a, or tinting using color for the area, cells, or data displayed within the layer. Tinting or coloring using a transparency enhancement layer 304a, 304b may be defined in terms of pixel values (e.g., RGV), or using other color definitions supported by the relevant display.

A transparency layer 304b may provide full transparency or opacity. A full transparency layer 304b may obscure, either entirely or partially, the data or region under the layer. A full transparency layer 304b may be used to hide unimportant or extraneous information, or may cover an area that will have another enhancement layer placed above it (e.g. a logic bubble). Alternatively or additionally, a full transparency layer 304b may provide a uniform or variegated coloration or tint.

A transparency enhancement layer 304a, 304b may be used to indicate a path or other connection between data displayed under the layer, such as by coloring one or more cells in a table enhancement layer to illustrate a path, connection, or similar relationship between the data in the cells. Because a transparency enhancement layer 304a, 304b may be integrated with other displayed enhancement layers, such effects need not obscure or block other portions of the displayed data, or prevent manipulation or other review of the displayed data.

Example 7—Logic Bubble Enhancement Layer

Figure 3D:
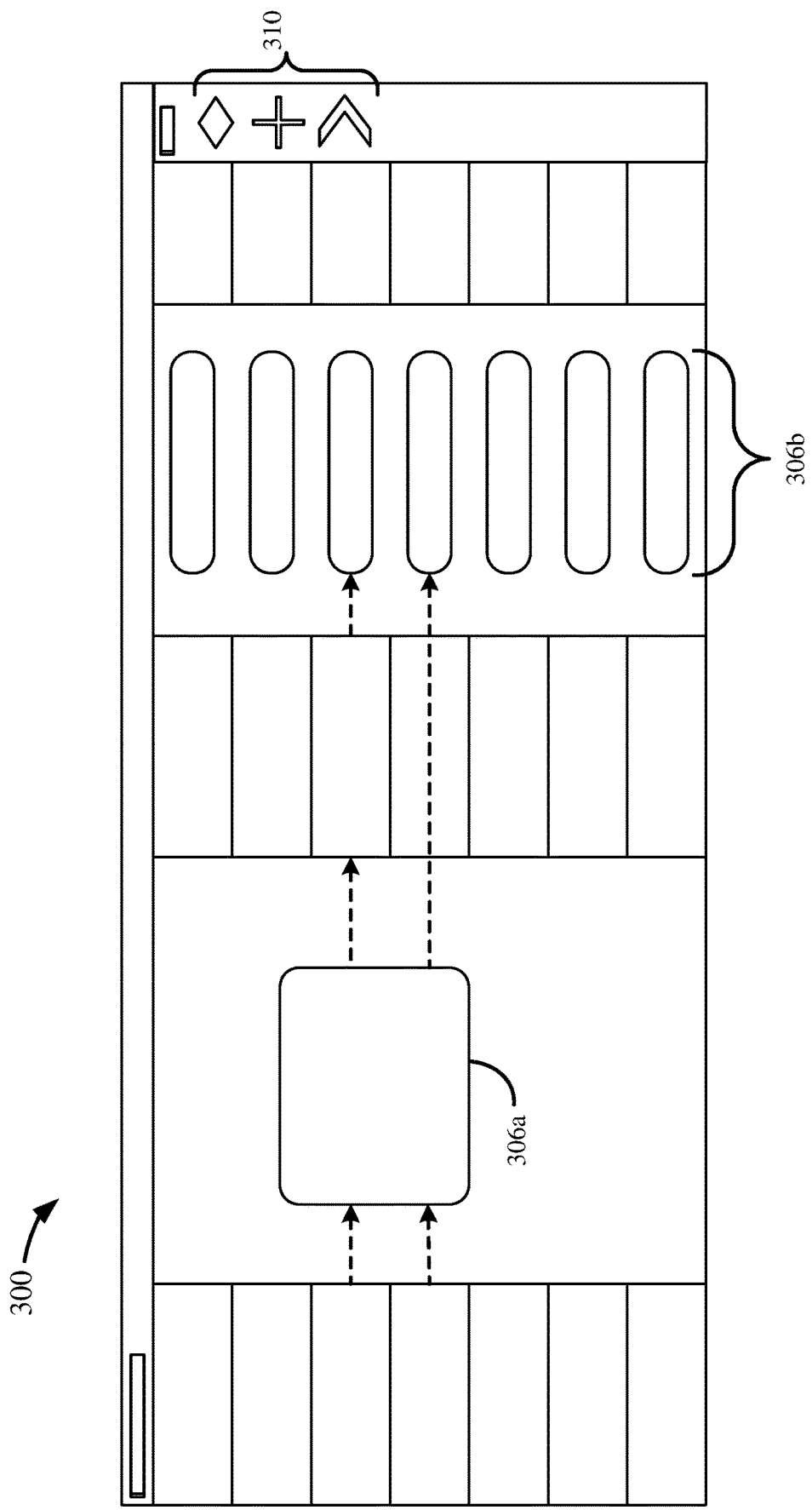
FIG. 3D is a diagram depicting a logic bubble enhancement layer in the user interface of FIG. 3A.

FIG. 3D is a diagram depicting a logic bubble enhancement layer in the user interface 300. The user interface 300 may be similar to the user interface 300 shown in FIGS. 3A-C. The user interface 300 may have a set of one or more buttons or widgets 310 for enhancement layers, similar to the widgets 310 in FIGS. 3A-C.

The user interface 300 may have a logic bubble enhancement layer, which may have one or more logic bubbles 306a, 306b. Alternatively or additionally, logic bubbles 306a, 306b may be instantiated across separate logic bubble enhancement layers. For example, logic bubble 306a may be implemented in a first logic bubble enhancement layer, and the set of logic bubbles 306b may be implemented in a second, separate logic bubble layer.

Logic bubbles 306a, 306b may be capable of displaying summary or results information. Logic bubbles 306a, 306b may display icons, widgets, text boxes, colors, patterns, or other visual representations of such summary or results information. Text information displayed in a logic bubble 306a, 306b may be natural language explanations of processes or results. Generally, logic bubbles 306a, 306b may display information based on analysis or other processing of the data from the data set which may be displayed in the user interface 300, although the processing or analysis may include (i.e., be based at least in part on) data not actually displayed. The analysis may be accomplished through rules, formulas, machine-learning or other intelligent algorithms to generate the summary or results. Similarly, rules, formulas, or machine-learning algorithms may also be used to determine the presentation within the logic bubbles 306a, 306b. In some embodiments, logic bubbles 306a, 306b may denote a relationship between content without actual calculations, such as analytical results of calculations on the data.

A logic bubble may be a simple logic bubble 306b or a complex logic bubble 306a. Simple logic bubbles 306b generally provide basic summary or results information without extensive graphics, such as a natural language summary for a single, or few, cells in a table layer. Complex logic bubbles 306a generally provide extensive summary, explanatory, or results information often utilizing more extensive graphics, such as icons in addition to text. Complex logic bubbles 306a may aggregate many fields of data, such as several cells (or rows or columns) in a table layer.

Example 8—Connector Enhancement Layer

Figure 3E:
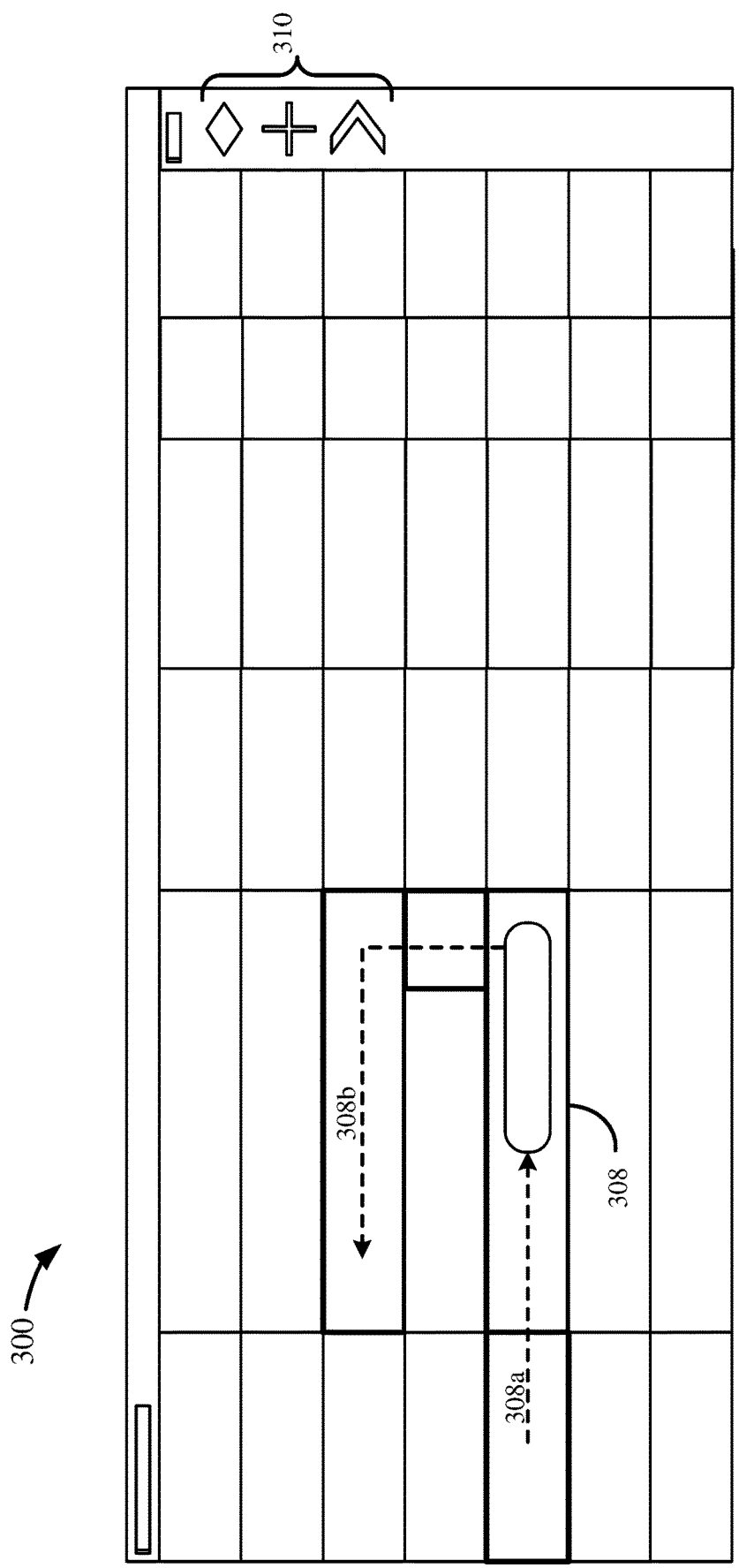
FIG. 3E is a diagram depicting a connector enhancement layer in the user interface of FIG. 3A.

FIG. 3E is a diagram depicting a connector enhancement layer in the user interface 300. The user interface 300 may be similar to the user interface 300 shown in FIGS. 3A-D. The user interface 300 may have a set of one or more buttons or widgets 310 for enhancement layers, similar to the widgets 310 in FIGS. 3A-D.

The user interface 300 may have a connector enhancement layer 308. The connector enhancement layer 308 may connect separate data displays, such as cells in a table layer, to form, illustrate, display, highlight, or otherwise visually indicate a relationship or flow between the data. The connector enhancement layer 308 may also include highlighting or coloring the relevant cells or fields, or this may be accomplished through an integrated transparency enhancement layer, further described herein. The connector enhancement layer 308 may also include icons, widgets, bubbles, or other graphics to form the connections, or this may be accomplished through an integrated logic bubble layer.

Specific connectors, such as the arrows 308a and 308b, may be used to visualize the connection between displayed fields or data. Specific connectors may have thickness, color, style, or other visual indicators which may be determined based on the relationship, flow, or other connection being illustrated. Rules, formulas, machine-learning algorithms, or other logic, may be used to determine the graphical representation of individual connectors 308a, 308b, or groups of connectors.

Example 9—Enhancement Layer Integration

Enhancement layers may be integrated together to form complete visualizations or diagrammatic representations of data relationships, flows, or other analytical results for a displayed data set. Integrating enhancement layers may include overlaying multiple enhancement layers to form a complete visual representation. For example, a transparency enhancement layer may color-code a set of fields in a table enhancement layer, and a connector enhancement layer may overlap the transparency enhancement layer to illustrate connections between the color-coded fields. As another example, a connector enhancement layer may be used to connect fields from a table enhancement layer to a logic bubble in a logic bubble enhancement layer, thus indicating which fields feed into the analysis or summary behind the logic bubble. Integrated enhancement layers may be linked, such that the separate integrated layers activate/deactivate, render, or perform other layer actions together. Alternatively or additionally, integrated enhancement layers may be grouped to form a single combination enhancement layer, with the functionality of the different grouped types of layers merged into a single combination enhancement layer.

A single display may have multiple enhancement layers, and further have multiple enhancement layers of a single type. For example, a data display may include multiple transparency layers, multiple logic bubble layers, multiple connector layers, and so on.

The enhancement layers may be grouped together to function as a single enhancement layer based on the underlying data or analytic results or relationships to which they apply. For example, a transparency layer and a connector layer may be grouped to form a single combination enhancement layer visualizing a relationship between elements across two data columns, while a logic bubble layer and a different connector layer may be grouped to form a separate combination enhancement layer that visualizes an analytical summary for a different set of columns Thus, a single data set display may have multiple combination enhancement layers formed from multiple other enhancement layers of varying types, as described herein.

Example 10—Enhancement Layer Manipulation and Customization

Generally, enhancement layers may be built during development, such as by programmers. The enhancement layers may also be defined or otherwise customized by users. Further, such customization may be performed at runtime. Such customization may include data manipulation, such as adding new data elements (e.g. columns, rows, sets, fields) from a data source, defining relationships between data sets or fields, performing table operations (e.g. sorting, grouping, filtering, showing/hiding), changing data in data fields, or running/re-running data calculations or simulations.

Selecting an enhancement layer element may activate the element, such as by re-rendering or re-running related analysis, or highlighting the element. For example, user input selecting a logic bubble may cause the logic bubble to become highlighted, and may further highlight any connectors to the logic bubbles or other related enhancement elements.

Customization may further include altering the displayed elements from the enhancement layers. For example, colors in a transparency layer may be customizable, as well as degree of opacity. As another example, icons displayed in a logic bubble may be customized, such as displaying a thumbs-up in place of a star for a positive result. Widgets or buttons, such as shown in FIGS. 2 and 3A-D may be used for customizing or manipulating enhancement layers.

Example 11—Enhancement Layer Visualization Scenarios

Figure 4A:
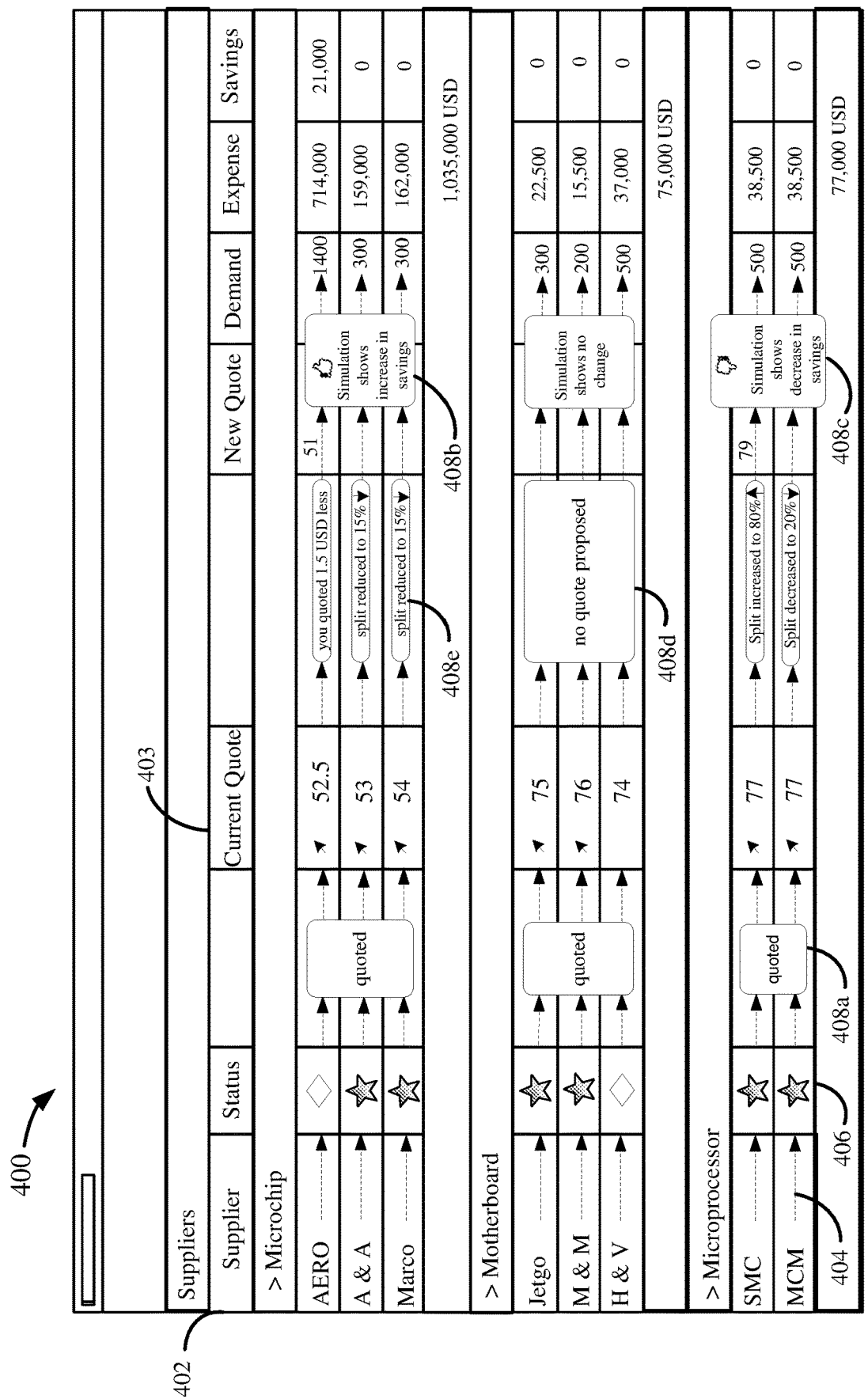
FIG. 4A is an example user interface displaying product provisioning data visualized with enhancement layers.

FIG. 4A is an example user interface 400 displaying product provisioning data visualized with enhancement layers as described herein. The product provisioning data may be displayed in a table visualized through a table enhancement layer 402. The table enhancement layer 402 may provide simulation functionality by calculating total costs based on product quotes 403 and demand (or request quantity). The table 402 (or analytical functionality associated with the table) may recalculate total costs and other values when a current quote 403 is changed. Enhancement layers may be used to enhance the table and simulation displayed. The rows of the table may be grouped, as described herein, such as by product type (i.e. microchip, motherboard, microprocessor)

Logic bubbles 408a-e in a logic bubble enhancement layer may be used to summarize the data hidden underneath it, such as for logic bubble 408a, or may be used to notify and summarize analytical results, such as for logic bubbles 408b and 408c. The logic bubbles 408a-c may be color-coded, or have other stylization attributes, to visually indicate differences between the substantive information provided by the logic bubbles. For example, the summarization logic bubble 408a may have a neutral color, such as blue or gray, to indicate it is general summary information, whereas logic bubble 408b may be green to indicate a positive result (reduced expenditure) while logic bubble 408c may be red to indicate a negative result (increased expenditure). As another example, if there is no difference between the values in cells of Current Quote and New Quote, a logic bubble 408d can be blank or display a custom message "no quote proposed". If there is a difference, "New Quote—Current Quote" can be calculated and the difference in values is displayed in the logic bubble 408e, using rules, formulas, machine-learning algorithms, or other logic for generating the display within the logic bubble.

Connectors, such as connector 404, may be used in a connector enhancement layer to illustrate data connections across the rows, including with logic bubbles. A transparency layer 406 may be used to dim the Supplier Status column, as that column may contain relevant information, but not important information. The transparency layer 406 (or additional transparency layers) may also be used to hide the information normally displayed behind or beneath the logic bubbles (e.g. logic bubbles 408a-c) or the connectors (e.g. connector 404).

The logic bubbles may change (e.g. be re-rendered) if the simulation is run again with new data. For example, if the Current Quote 403 (or New Quote, etc.) is changed and new simulated costs are calculated, the logic bubbles (e.g. logic bubbles 408a-c) may update to reflect the changes, as well as other enhancement layers. For example, logic bubble 408b may change to show a thumbs-down icon and be colored red if a quote, such as Current Quote 403 (or the New Quote field) is raised sufficiently to increase the total cost and lose any savings. Field data, such as the Current Quote 403, may be changed through the user interface or from updating with new data from a data source.

FIG. 4B is an example user interface 410 displaying inventory supply and use data visualized with enhancement layers as described herein. The supply data may be displayed in a tree table visualized through a table enhancement layer 412. Further enhancement layers may be used to visualize use relationships (e.g. which items listed were combined, applied to, or used with other items listed) between inventory items listed. Transparency enhancement layers 418a, 418b may be used to highlight relationships between different items. The transparency enhancement layers 418a, 418b may be similarly stylized, such as using the same color-coding, to indicate that the two use relationships are related. Alternatively, the transparency enhancement layers 418a, 418b may be differently stylized, such as using different color-coding, to indicate that the two use relationships are unrelated. A connector enhancement layer 414a, 414b may be used to show the connection between the items, such as by arrows in this example. A logic bubble enhancement layer 416a, 416b may be used to indicate the number of inventory units used or moved. The underlying data indicating the connections between the used objects and number of inventory units used may not be displayed in the tree table 412, but may be obtained from analysis of related data. Thus, additional data may be displayed that normally would not be readily available from a table.

In some embodiments, the enhancement layers 414a, 416a, 418a for the "nuts-cockpit" connection may be integrated together, separate from the enhancement layers 414b, 416b, 418b for the "crankshaft-cylinder block" connection (which may also be integrated together). Alternatively, similarly typed enhancement elements may be implemented in enhancement layers (e.g. logic bubble 416a and logic bubble 416b may be in the same logic bubble enhancement layer). Alternatively, each enhancement element may be implemented in a separate or discrete enhancement layer, or other layer combination as described herein.

FIG. 4C is an example user interface 420 displaying task and responsibility data visualized with enhancement layers as described herein. The task data may be displayed in a tree table visualized through a table enhancement layer 422. Further enhancement layers may be used to visualize a process flow for the tasks of a specific responsible individual. A transparency layer 428 may be used to highlight the responsible individual "Kim Mae." Logic bubbles 426a, 426b, arranged across one or multiple logic bubble enhancement layers, may be used to indicate which tasks apply, their order, and other information, such as date, time, or duration. Connectors 424a, in a connector enhancement layer, may be used to further highlight and indicate the order of tasks as a process flow. Connectors 424b, in a connector enhancement layer, may be used to connect the tasks to their associated product quantities. A transparency enhancement layer 430 may be used to hide the inapplicable quantity values. The various enhancement layers used to visualize the task flow for "Kim Mae" may all be color-coded similarly to further emphasize their interconnection.

The "Kim Mae" field or data value (e.g. content) may be highlighted using a logic bubble, a transparency layer, a table layer with colored text, or other enhancement layer technology as described herein. The separate "Kim Mae" values in different rows may be enhanced using a single layer, or separate layers, or integrated or merged layers.

The enhancement layers 424a-b, 426a-b, 428 may be integrated together as linked layers or a single combination layer for illustrating tasks and task flow for a single responsible individual, "Kim Mae" in this example. Other integrated or combination layers may be similarly used for other responsible individuals (e.g. values in a given column). For example, a similar set of enhancement layers may be used to visualize the tasks and task flow for responsible individual "John Miller." Such a set of enhancement layers may have differently customized characteristics to distinguish it from the "Kim Mae" task flow, such as using a different color for color-coding. Buttons or other widgets may be used to display or hide the relevant enhancement layers for the task flows of different individuals. For example, a button may be used to activate visualization of the task flow for "Kim Mae," or selecting the data value "Kim Mae" may activate the task flow visualization for her.

Example 12—Enhancement Layer Module Environments

Figure 5A:
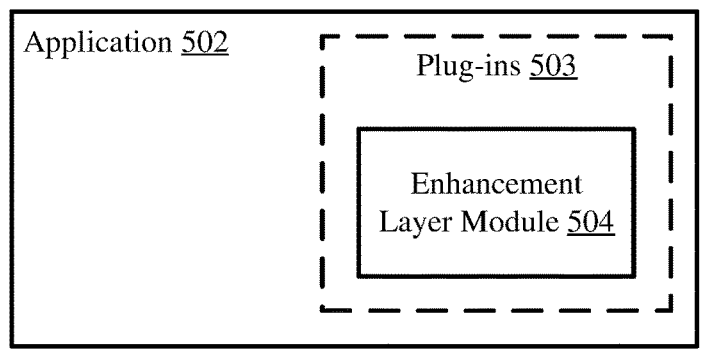
FIG. 5A is a schematic diagram depicting an application environment for an enhancement layer module.

FIG. 5A is a schematic diagram depicting an application environment for an enhancement layer module 504, which may provide enhanced data visualization and manipulation functionality as described herein. An application 502, such as a software application running in a computing environment, may have one or more plug-ins 503 (or add-ins or other software extensions to programs) that add functionality to, or otherwise enhance, the application. The enhancement layer module 504 may be integrated with the application 502; for example, the enhancement layer module may be integrated as a plug-in. The enhancement layer 504 may add functionality to the application 502 for enhanced data visualization and manipulation, which may be displayed in a user interface or otherwise provided to a user. For example, the application 502 may be a data analytics or data reporting software, or database management application, and the enhancement layer module 504 may be integrated with the analytics or management application to provide enhanced data visualization and manipulation functionality.

Figure 5B:
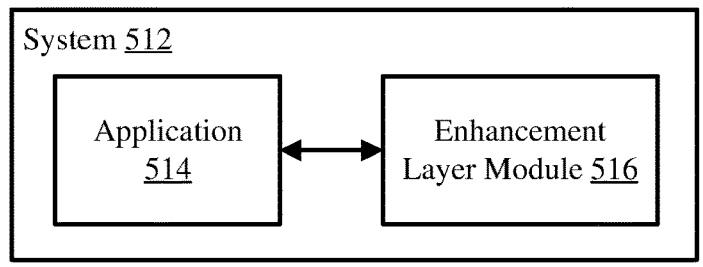
FIG. 5B is a schematic diagram depicting a system environment for an enhancement layer module.

FIG. 5B is a schematic diagram depicting a system environment for an enhancement layer module 516, which may provide enhanced data visualization and manipulation functionality as described herein. The enhancement layer module 516 may be integrated with a computer system 512. The computer system 512 may include an operating system, or otherwise be a software platform, and the enhancement layer module 516 may be an application or service running in the operating system or platform, or the enhancement layer module may be integrated within the operating system or platform as a service or functionality provided through the operating system or platform. The system 512 may be a server or other networked computer or file system. Additionally or alternatively, the enhancement layer module 516 may communicate with and provide enhanced data visualization and manipulation functionality, as described herein, to one or more applications 514, such as data analytics, data reporting, or database management application, in the system 512.

Figure 5C:
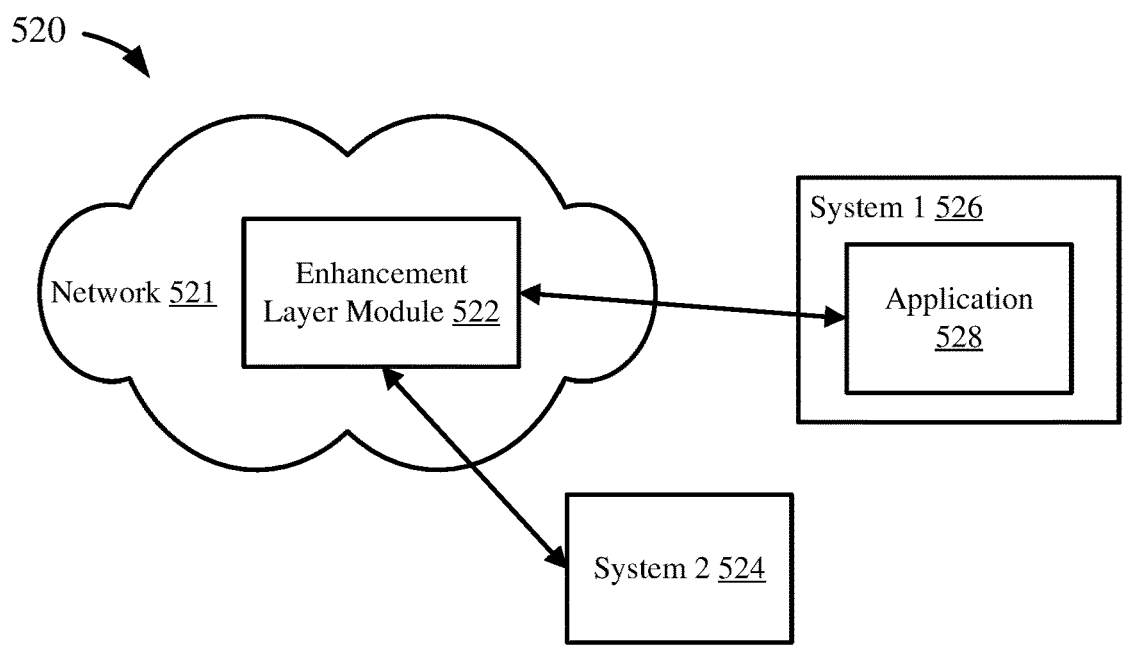
FIG. 5C is a schematic diagram depicting a network environment for an enhancement layer module.

FIG. 5C is a schematic diagram depicting a network environment 520 for an enhancement layer module 522, which may provide enhanced data visualization and manipulation functionality as described herein. The enhancement layer module 522 may be available on a network 521, or integrated with a system (such as from FIG. 5B) on a network. Such a network 521 may be a cloud network or a local network. The enhancement layer module 522 may be available as a service to other systems on the network 521 or that have access to the network (e.g., may be on-demand software or SaaS). For example, system 2 524 may be part of, or have access to, the network 521, and so can utilize enhanced data visualization and manipulation functionality from the enhancement layer module 522. Additionally, system 1 526, which may be part of or have access to the network 521, may have one or more applications, such as application 528, that may utilize enhanced data visualization and manipulation functionality from the enhancement layer module 522.

In these ways, the enhancement layer module 504, 516, 522 may be integrated into an application, a system, or a network, to provide enhanced data visualization and manipulation functionality as described herein.

Example 13—Visualization Processes Using Enhancement Layers

Figure 6A:
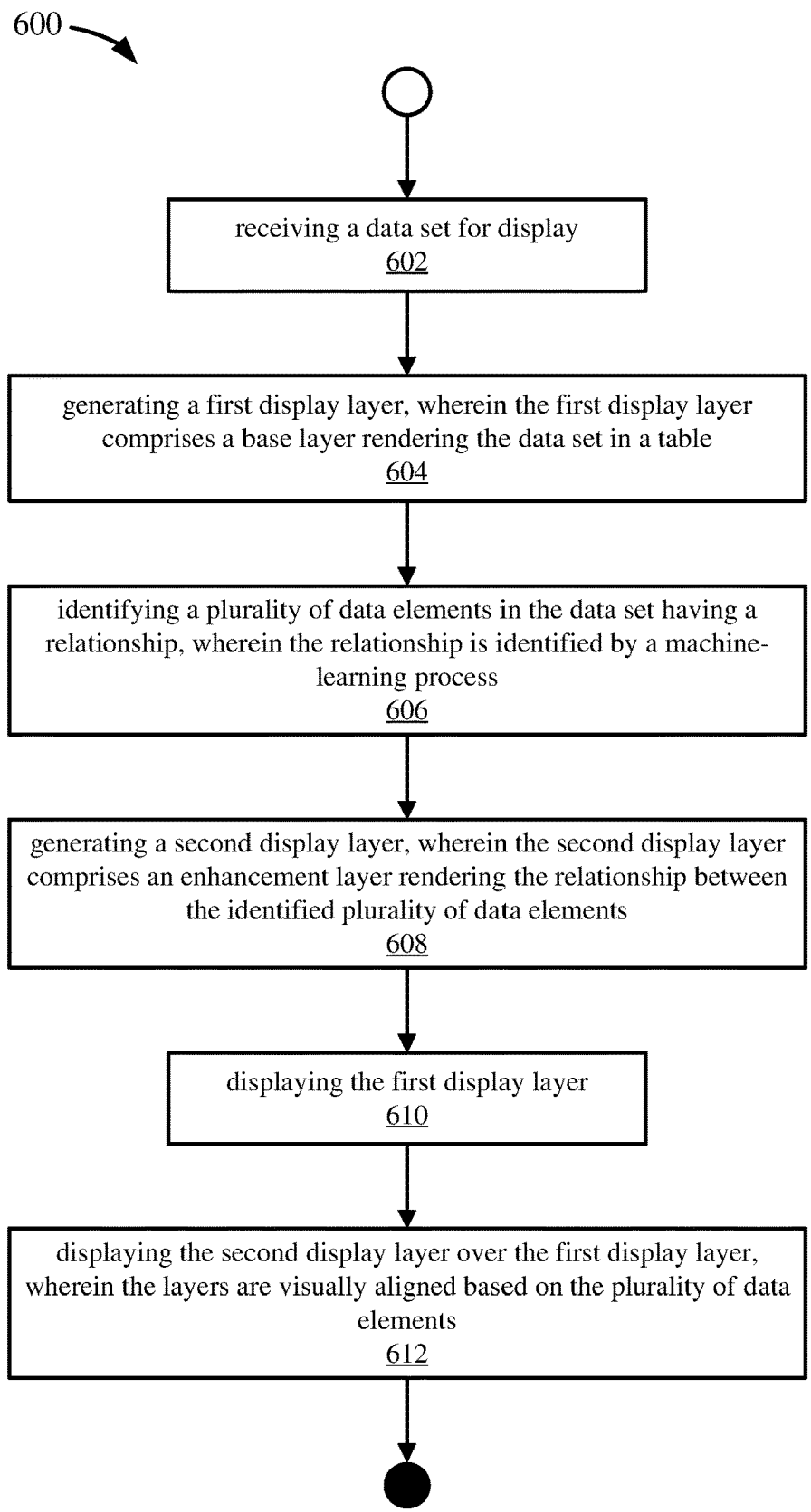
FIG. 6A is a flowchart illustrating a process for performing data visualization enhancement operations.

FIG. 6A is a flowchart illustrating a process 600 for performing data visualization enhancement operations. A data set may be received for display at 602. A first display layer may be generated at 604. The first display layer may include a base layer rendering the data set in a table. A plurality of data elements in the data set may be identified as having a relationship at 606. The relationship may be identified by a machine-learning process. A second display layer may be generated at 608. The second display layer may include an enhancement layer rendering the relationship between the identified plurality of data elements. The first display layer may be displayed at 610. The second display layer may be displayed over the first display layer at 612. The layers may be visually aligned based on the plurality of data elements.

Figure 6B:
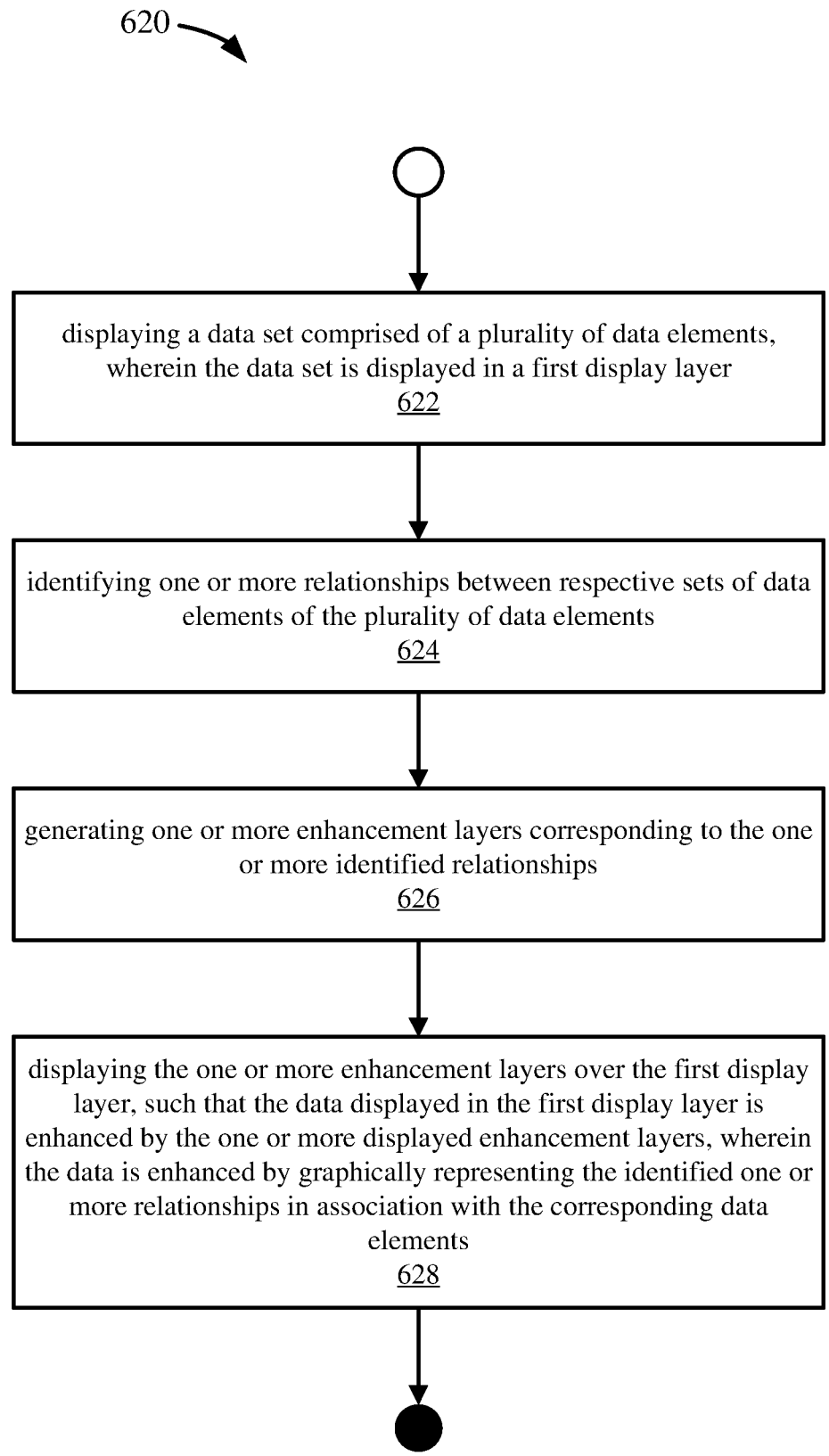
FIG. 6B is a flowchart illustrating a method for generating data visualization enhancements.

FIG. 6B is a flowchart illustrating a method 620 for generating data visualization enhancements. A data set having multiple data elements may be displayed at 622. The data set may displayed in a first display layer. One or more relationships between respective sets of data elements of the multiple data elements may be identified at 624. One or more enhancement layers corresponding to the one or more identified relationships may be generated at 626. The one or more enhancement layers may be displayed over the first display layer at 628, such that the data displayed in the first display layer may be enhanced by the one or more displayed enhancement layers. The data may be enhanced by graphically representing the identified one or more relationships in association with the corresponding data elements at 628.

Figure 6C:
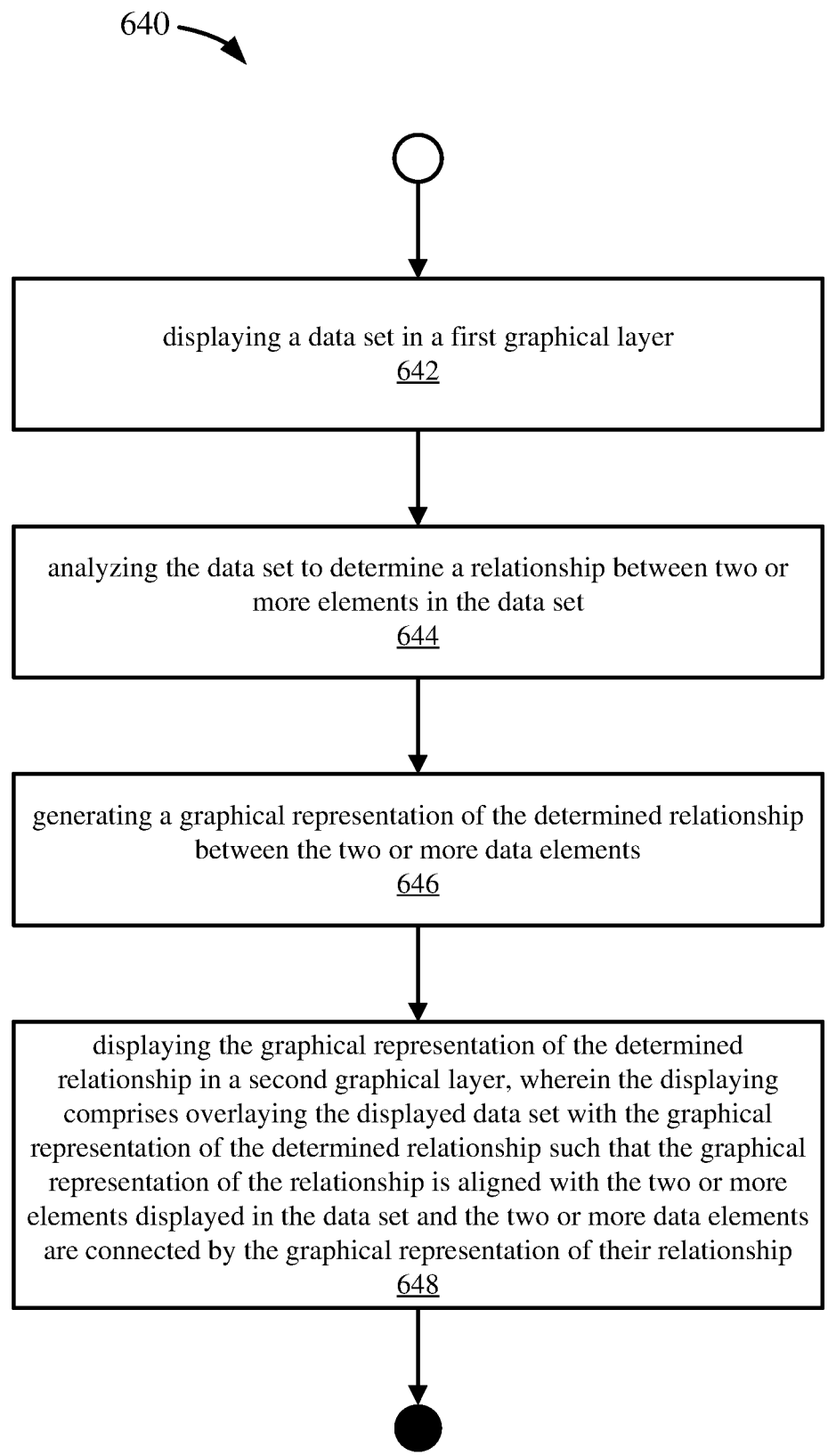
FIG. 6C is a flowchart illustrating a method for graphical data presentation enhancements.

FIG. 6C is a flowchart illustrating a method 640 for graphical data presentation enhancements. A data set may be displayed in a first graphical layer at 642. The data set may be analyzed to determine a relationship between two or more elements in the data set at 644. A graphical representation of the determined relationship between the two or more data elements may be generated at 646. The graphical representation of the determined relationship may be displayed in a second graphical layer at 648. Displaying the graphical representation at 648 may include overlaying the displayed data set with the graphical representation of the determined relationship such that the graphical representation of the relationship is aligned with the two or more elements displayed in the data set and the two or more data elements are connected by the graphical representation of their relationship.

Example 14—Computing Systems

Figure 7:
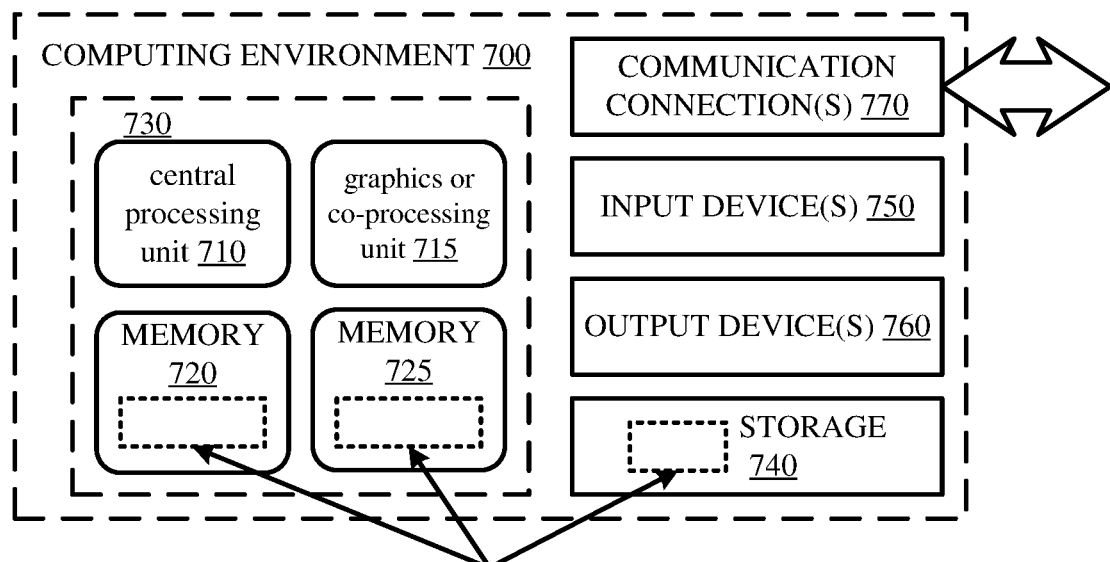
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 2A-B and 6A-C, the interfaces of FIGS. 3A-E and 4A-C, or the systems of FIGS. 1A-B, and 5A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store settings or settings characteristics, databases, data sets, interfaces, or displays shown in FIGS. 1A-B, 3A-E, and 4A-C, systems shown in FIGS. 1A-B and 5A-C, or the steps of the processes shown in FIGS. 2A-B and 6A-C.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Cloud Computing Environment

Figure 8:
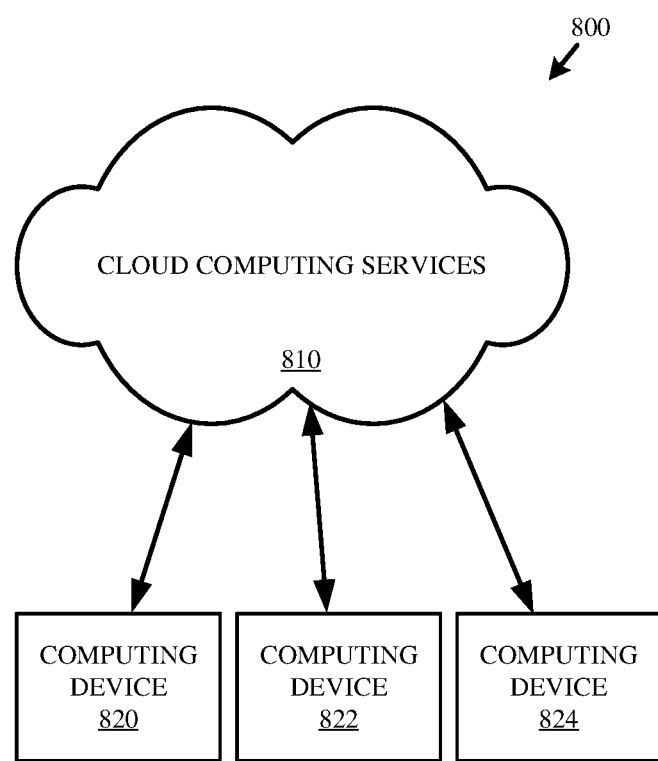
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 16—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
one or more memories;
one or more processing units coupled to the one or more memories; and
one or more computer-readable storage media storing instructions that, when executed, cause the computing system to perform operations comprising:
receiving a data set for display;
generating a first display, the generating comprising rendering the data set in a table, the table comprising a plurality of cells organized into a plurality of columns and a plurality of rows, wherein at least a portion of the plurality of columns correspond to fields of the table and at least a portion of the cells of one or more rows of the plurality of rows comprise a value from the data set for each of one or more columns corresponding to the fields of the table;
identifying a plurality of data elements in the data set having a relationship, a first data element of the plurality of data elements being displayed in a first cell of the plurality of cells, a second data element of the plurality of data elements being displayed in a second cell of the plurality of cells, a third data element of the plurality of data elements being displayed in a third cell of the plurality of cells, and a fourth data element of the plurality of data elements being displayed in a fourth cell of the plurality of cells;
generating a second display, wherein the second display comprises at least a portion of the table, and the generating a second display comprises:
rendering a connector showing a relationship between:
(A) the first cell of a first row of the plurality of rows at a first column of the plurality of columns and the second cell of a second row of the plurality of rows at the first column, at least a first portion of the connector being displayed connected to or displayed over the first cell and at least a second portion of the connector being displayed connected to or displayed over the second cell; or
(B) the third cell of the first row at a first field of the fields of the table and the fourth cell of the first row at a second field of the fields of the table, at least a third portion of the connector being displayed connected to or displayed over the third cell and at least a fourth portion of the connector being displayed connected to or displayed over the fourth cell.

2. The computing system of claim 1, wherein the generating a second display is performed at least in part using a machine-learning algorithm.

3. The computing system of claim 1, wherein the first display is a first display layer and the second display is a second display layer, and the second display layer is displayed over the first display layer.

4. The computing system of claim 3, the operations further comprising:
aligning the first display layer and the second display layer.

5. The computing system of claim 4, wherein the aligning is based at least in part on a column of the table.

6. The computing system of claim 4, wherein the aligning is based at least in part on metadata for the second display layer.

7. The computing system of claim 3, wherein generating a second display comprises obscuring at least a portion of the cells, the obscuring comprising obscuring multiple rows for at least one column of the table to provide an obscured region.

8. The computing system of claim 7, wherein generating a second display comprises rendering a logic bubble over at least a portion of the obscured region.

9. The computing system of claim 1, the operations further comprising:
receiving user input providing a first value for a fifth cell of the table, wherein the identifying a plurality of data elements in the data set having a relationship comprises identifying a relationship between the first value and at least a second value for a sixth cell of the table.

10. The computing system of claim 9, wherein the relationship provides an updated value for the sixth cell of the table.

11. The computing system of claim 10, wherein generating a second display comprises rendering a logic bubble describing the updated value.

12. The computing system of claim 10, wherein generating a second display comprises rendering a logic bubble describing a difference between the first value of the fifth cell and a third value of the fifth cell, the third value being a value in the data set prior to receiving the user input.

13. The computing system of claim 1, wherein the relationship is identified by a machine-learning process.

14. The computing system of claim 1, wherein generating the second display further comprises:
rendering a logic bubble comprising text describing the identified relationship between the first data element and the second data element or between the third data element and the fourth data element (1) at a position that is connected to or is displayed over the first cell or the second cell, when the relationship is between the first data element and the second data element, or at a position that is connected to or is displayed over the third cell or the fourth cell, when the relationship is between the third data element and the fourth data element; or (2) in conjunction with one or more additional visual elements that are displayed over or connected to the logic bubble and at least one of the first cell or the second cell, when the relationship is between the first data element and the second data element and the first cell and the second cell are in different rows of the plurality of rows and in the same column of the plurality of columns, or are displayed over or connected to at least one of the third cell or the fourth cell when the relationship is between the third data element and the fourth data element and the third cell and the fourth cell are in the same row of the plurality of rows and at different fields of the fields of the table.

15. The computing system of claim 1, wherein generating the second display further comprises:
obscuring at least a portion of the plurality of cells displaying values for at least a portion of the data elements to provide one or more obscured cells, where obscured cells are not identified as having the relationship.

16. A method comprising:
receiving a data set for display;
generating a first display, the generating comprising rendering the data set in a table, the table comprising a plurality of cells organized into a plurality of columns and a plurality of rows, wherein at least a portion of the plurality of columns correspond to fields of the table and at least a portion of the cells of one or more rows of the plurality of rows comprise a value from the data set for each of one or more columns corresponding to the fields of the table;
identifying a plurality of data elements in the data set having a relationship, a first data element of the plurality of data elements being displayed in a first cell of the plurality of cells, a second data element of the plurality of data elements being displayed in a second cell of the plurality of cells, a third data element of the plurality of data elements being displayed in a third cell of the plurality of cells, and a fourth data element of the plurality of data elements being displayed in a fourth cell of the plurality of cells; and
generating a second display, wherein the second display comprises at least a portion of the table, and the generating a second display comprises rendering a connector showing a relationship between (A) the first cell and the second cell, wherein the first cell is in a first row of the plurality of rows at a first column of the plurality of columns and the second cell is in a second row of the plurality of rows at the first column, at least a first portion of the connector being displayed connected to or displayed over the first cell and at least a second portion of the connector being displayed connected to or displayed over the second cell; or between (B) the third cell and the fourth cell, wherein the third cell is in the first row of the plurality of rows and at a first field of the fields of the table and the fourth cell is in the first row of the plurality of rows and at a second field of the fields of the table, at least a third portion of the connector being displayed connected to or displayed over the third cell and at least a fourth portion of the connector being displayed connected to or displayed over the fourth cell.

17. The method of claim 16, wherein the relationship is determined via a machine-learning algorithm.

18. The method of claim 16, wherein the second display is generated via a machine-learning algorithm.

19. One or more non-transitory computer-readable storage media comprising:
computer-executable instructions that, when executed by a computing system comprising at least one processor and at least one memory coupled to the at least one processor, cause the computing system to receive a data set for display;
computer-executable instructions that, when executed by a computing system, cause the computing system to generate a first display, the generating comprising rendering the data set in a table, the table comprising a plurality of cells organized into a plurality of columns and a plurality of rows, wherein at least a portion of the plurality of columns correspond to fields of the table and at least a portion of the cells of one or more rows of the plurality of rows comprise a value from the data set for each of one or more columns corresponding to the fields of the table;
computer-executable instructions that, when executed by a computing system, cause the computing system to identify a plurality of data elements in the data set having a relationship, a first data element of the plurality of data elements being displayed in a first cell of the plurality of cells, a second data element of the plurality of data elements being displayed in a second cell of the plurality of cells, a third data element of the plurality of data elements being displayed in a third cell of the plurality of cells, and a fourth data element of the plurality of data elements being displayed in a fourth cell of the plurality of cells; and computer-executable instructions that, when executed by a computing system, cause the computing system to generate a second display, wherein the second display comprises at least a portion of the table, and the generating a second display comprises rendering a connector showing a relationship between (A) the first cell and the second cell, wherein the first cell is in a first row of the plurality of rows at a first column of the plurality of columns and the second cell is in a second row of the plurality of rows at the first column, at least a first portion of the connector being displayed connected to or displayed over the first cell and at least a second portion of the connector being displayed connected to or displayed over the second cell; or between (B) the third cell and the fourth cell, wherein the third cell is in a first row of the plurality of rows and at a first field of the fields of the table and the fourth cell is in the first row of the plurality of rows and at a second field of the fields of the table, at least a third portion of the connector being displayed connected to or displayed over the third cell and at least a fourth portion of the connector being displayed connected to or displayed over the fourth cell.

20. The one or more non-transitory computer-readable storage media of claim 19, wherein at least one of the one or more relationships is identified via a machine-learning algorithm.

\* \* \* \* \*